United States Patent
Karube

(10) Patent No.: US 12,207,021 B2
(45) Date of Patent: Jan. 21, 2025

(54) DISASTER INFORMATION PROCESSING APPARATUS, OPERATION METHOD OF DISASTER INFORMATION PROCESSING APPARATUS, OPERATION PROGRAM OF DISASTER INFORMATION PROCESSING APPARATUS, AND DISASTER INFORMATION PROCESSING SYSTEM

(71) Applicant: FUJIFILM Corporation, Tokyo (JP)

(72) Inventor: Mikihiko Karube, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 141 days.

(21) Appl. No.: 18/191,669

(22) Filed: Mar. 28, 2023

(65) Prior Publication Data
US 2023/0239437 A1 Jul. 27, 2023

Related U.S. Application Data

(63) Continuation of application No. PCT/JP2021/032903, filed on Sep. 7, 2021.

(30) Foreign Application Priority Data

Oct. 1, 2020 (JP) ................................ 2020-167014

(51) Int. Cl.
  *H04N 23/61* (2023.01)
  *G06V 20/10* (2022.01)
  (Continued)

(52) U.S. Cl.
  CPC ............. *H04N 7/181* (2013.01); *G06V 20/17* (2022.01); *G06V 20/176* (2022.01); *H04N 23/61* (2023.01)

(58) Field of Classification Search
  CPC ...... H04N 7/181; G06V 20/17; G06V 20/176; G04N 23/61
  (Continued)

(56) References Cited

U.S. PATENT DOCUMENTS

2014/0146172 A1 5/2014 Kajitani et al.

FOREIGN PATENT DOCUMENTS

| JP | 2004-056664 A | 2/2004 |
| JP | 2013-134663 A | 7/2013 |

(Continued)

OTHER PUBLICATIONS

International Search Report issued in PCT/JP2021/032903; mailed Nov. 16, 2021.
(Continued)

*Primary Examiner* — Nguyen T Truong

(74) *Attorney, Agent, or Firm* — Studebaker & Brackett PC

(57) ABSTRACT

Provided are a disaster information processing apparatus, an operation method of a disaster information processing apparatus, an operation program of a disaster information processing apparatus, and a disaster information processing system capable of grasping a damage situation at a disaster site in a short time without waste. A RW control unit receives a first aerial image obtained by capturing a first imaging range including an area by a first camera mounted on a first drone. A first damage situation analysis unit analyzes a first damage situation of a disaster in the first imaging range based on the first aerial image. A second imaging range determination unit determines a second imaging range of a second camera mounted on a second drone based on a first analysis result, and the second imaging range is relatively narrower than the first imaging range.

11 Claims, 19 Drawing Sheets

(51) Int. Cl.
*G06V 20/17* (2022.01)
*H04N 7/18* (2006.01)

(58) Field of Classification Search
USPC .......................................... 348/144
See application file for complete search history.

(56) References Cited

FOREIGN PATENT DOCUMENTS

| | | |
|---|---|---|
| JP | 2019-047755 A | 3/2019 |
| WO | 2012/169232 A1 | 12/2012 |
| WO | 2013/051300 A1 | 4/2013 |
| WO | 2019/235415 A1 | 12/2019 |

OTHER PUBLICATIONS

International Preliminary Report on Patentability (Chapter I) and Written Opinion of the International Searching Authority issued in PCT/JP2021/032903; issued Mar. 28, 2023.

| ORDER | LONGITUDE AND LATITUDE | AZIMUTH | ALTITUDE |
|---|---|---|---|
| 1 | | 0° | |
| 2 | EAST LONGITUDE 136°17' 22" (SKY ABOVE DEPARTURE | 90° | 500m |
| 3 | NORTH LATITUDE 34°82' 29" AND ARRIVAL BASE) | 180° | |
| 4 | | 270° | |

70 — FIRST IMAGING RANGE INFORMATION

DISASTER INFORMATION PROCESSING APPARATUS, OPERATION METHOD OF DISASTER INFORMATION PROCESSING APPARATUS, OPERATION PROGRAM OF DISASTER INFORMATION PROCESSING APPARATUS, AND DISASTER INFORMATION PROCESSING SYSTEM

CROSS-REFERENCE TO RELATED APPLICATIONS

This application is a continuation application of International Application No. PCT/JP2021/032903 filed on Sep. 7, 2021, the disclosure of which is incorporated herein by reference in its entirety. Further, this application claims priority from Japanese Patent Application No. 2020-167014 filed on Oct. 1, 2020, the disclosure of which is incorporated herein by reference in its entirety.

BACKGROUND

1. Technical Field

The disclosed technology relates to a disaster information processing apparatus, an operation method of a disaster information processing apparatus, an operation program of a disaster information processing apparatus, and a disaster information processing system.

2. Description of the Related Art

Various disasters such as earthquakes, tsunamis, volcanic eruptions, floods and/or landslides caused by heavy rains, and large-scale fires have been occurring in various places. In the related art, various countermeasures for grasping a damage situation of such a disaster have been proposed. For example, JP2013-134663A describes a disaster information processing apparatus that sends a drone to a disaster site, causes a camera mounted on the drone to capture the disaster site, and grasps a damage situation at the disaster site based on an aerial image obtained in this manner. The disaster site is, for example, a main building in a disaster-stricken area where fire is occurring, a main building in a disaster-stricken area inundated by a flood, and the like.

SUMMARY

In JP2013-134663A, the discussion proceeds on the assumption that the disaster site is known to some extent. However, although a rough disaster-stricken area including the disaster site can be known immediately after the occurrence of a disaster, it is not clear where the disaster site is in the disaster-stricken area is the disaster site due to confusion peculiar to the disaster such as destruction of an information transmission infrastructure such as a mobile phone base station in many cases.

In a situation where it is not clear where the disaster site is in the disaster-stricken area, for example, it is considered that the damage situation at the disaster site is grasped with one drone. In this case, since it is necessary to thoroughly explore the disaster-stricken area with one drone, it can be easily imagined that it will take a very long time.

In contrast, it is considered that the damage situation at the disaster site is grasped with a plurality of drones. In this case, in a case where the disaster-stricken area is shared and explored by the plurality of drones, a time can be shortened as compared with the case of one drone. However, simply flying the plurality of drones without any goal is wasteful.

One embodiment according to the disclosed technology provides a disaster information processing apparatus, an operation method of a disaster information processing apparatus, an operation program of a disaster information processing apparatus, and a disaster information processing system capable of grasping a damage situation at a disaster site in a short time without waste.

A disaster information processing apparatus of the present disclosure comprises a processor, and a memory connected to or built in the processor. The processor is configured to receive a first aerial image obtained by capturing a first imaging range including a disaster-stricken area by a first camera mounted on a first drone, analyze a first damage situation of a disaster in the first imaging range based on the first aerial image, and determine a second imaging range of a second camera mounted on a second drone based on an analysis result of the first damage situation, the second imaging range being relatively narrower than the first imaging range.

It is preferable that the processor is configured to determine, as the second imaging range, an imaging range including a region where damage is determined to be relatively large as a result of the analysis of the first damage situation in the disaster-stricken area.

It is preferable that the processor is configured to receive a second aerial image obtained by capturing the second imaging range by the second camera, and analyze a second damage situation of the disaster in the second imaging range based on the second aerial image.

It is preferable that the processor is configured to analyze the second damage situation based on the first aerial image in addition to the second aerial image.

It is preferable that the processor is configured to set flight altitude of the second drone to be lower than flight altitude of the first drone.

It is preferable that the processor is configured to analyze the first damage situation for each compartment including a plurality of adjacent buildings.

It is preferable that a flight range is set for the second drone in advance, and the processor is configured to determine, as the second imaging range of a target second drone, an imaging range including a region where damage is determined to be relatively large in a case where damage of a region within the flight range of the target second drone is determined to be relatively small and there is a region where damage is determined to be relatively large in a flight range different from the flight range of the target second drone as a result of the analysis of the first damage situation.

It is preferable that a plurality of the second drones are provided, and the processor is configured to determine the second imaging range for each of the plurality of second drones.

An operation method of a disaster information processing apparatus of the present disclosure comprises receiving a first aerial image obtained by capturing a first imaging range including a disaster-stricken area by a first camera mounted on a first drone, analyzing a first damage situation of a disaster in the first imaging range based on the first aerial image, and determining a second imaging range of a second camera mounted on a second drone based on an analysis result of the first damage situation, the second imaging range being relatively narrower than the first imaging range.

An operation program of a disaster information processing apparatus of the present disclosure causes a computer to execute processing of receiving a first aerial image obtained by capturing a first imaging range including a disaster-stricken area by a first camera mounted on a first drone, analyzing a first damage situation of a disaster in the first imaging range based on the first aerial image, and determining a second imaging range of a second camera mounted on a second drone based on an analysis result of the first damage situation, the second imaging range being relatively narrower than the first imaging range.

A disaster information processing system of the present disclosure comprises a first drone on which a first camera that captures a first imaging range including a disaster-stricken area to output a first aerial image is mounted, a second drone on which a second camera that captures a second imaging range relatively narrower than the first imaging range to output a second aerial image is mounted, a processor, and a memory connected to or built in the processor. The processor is configured to receive the first aerial image, analyze a first damage situation of a disaster in the first imaging range based on the first aerial image, and determine the second imaging range based on an analysis result of the first damage situation.

According to the disclosed technology, it is possible to provide the disaster information processing apparatus, the operation method of a disaster information processing apparatus, the operation program of a disaster information processing apparatus, and the disaster information processing system capable of grasping the damage situation at the disaster site in a short time without waste.

BRIEF DESCRIPTION OF THE DRAWINGS

Exemplary embodiments according to the technique of the present disclosure will be described in detail based on the following figures, wherein.

DETAILED DESCRIPTION

First Embodiment

Figure 1:
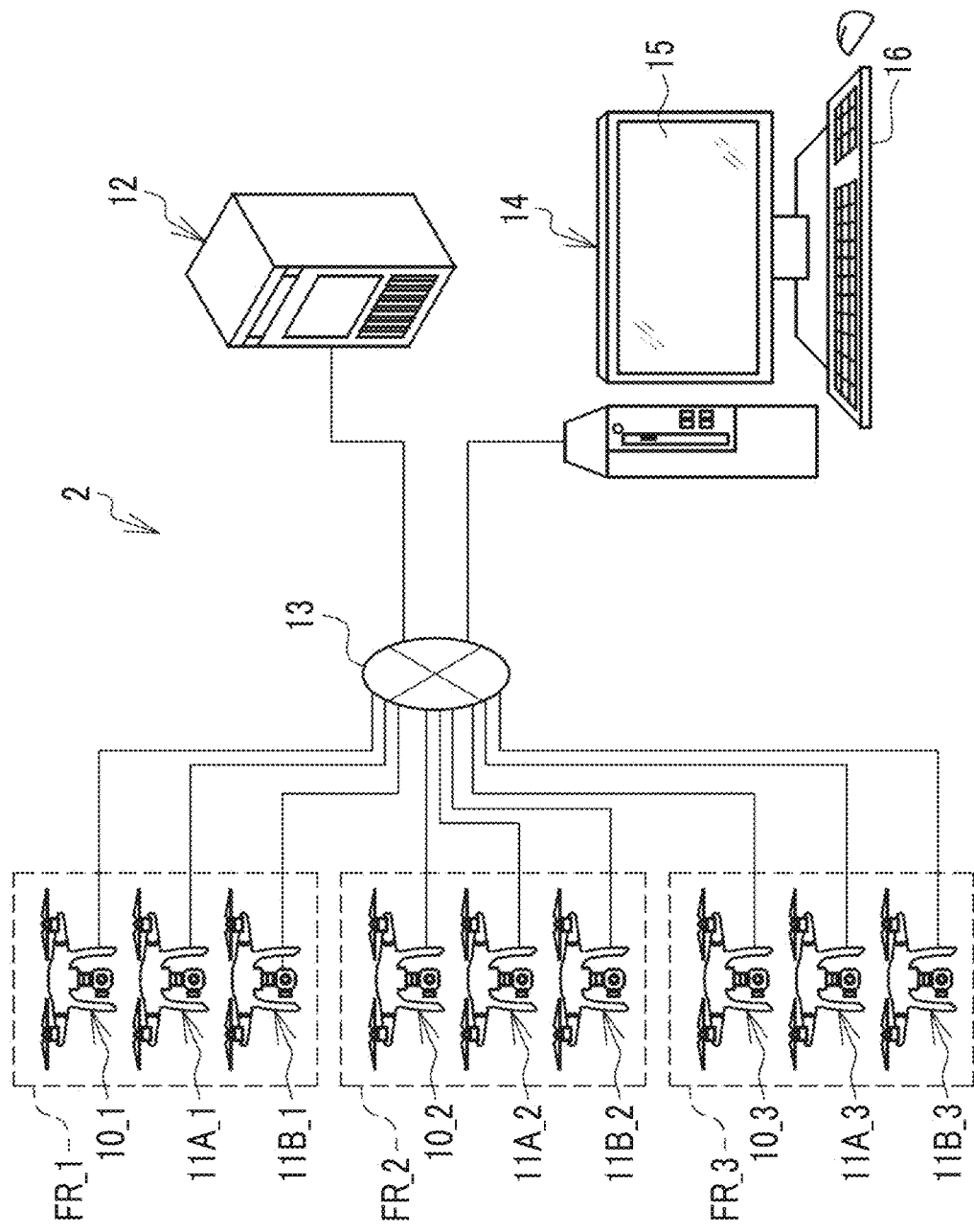
FIG. 1 is a diagram showing a disaster information processing system.

As an example, as shown in FIG. 1, a disaster information processing system 2 for grasping a damage situation of a disaster comprises first drones 10_1, 10_2, and 10_3, second drones 11A_1, 11B_1, 11A_2, 11B_2, 11A_3, and 11B_3, and a disaster information processing server 12. The first drones 10_1, 10_2, and 10_3 and the second drones 11A_1, 11B_1, 11A_2, 11B_2, 11A_3, and 11B_3 are identical models and have the same performance. Hereinafter, in a case where it is not necessary to distinguish between the first drones 10_1, 10_2, and 10_3, the first drones are collectively referred to as the first drones 10. Similarly, the second drones 11A_1, 11B_1, 11A_2, 11B_2, 11A_3, and 11B_3 are collectively referred to as the second drones 11. Underbars may be similarly omitted for reference numerals having other underbars (such as FR_1, FR_2, and FR_3, FB_1, FB_2, and FB_3, 80_N, 80_E, 80_S, and 80_W).

The first drone 10_1 and the second drones 11A_1 and 11B_1 are in charge of a first flight range FR_1. The first drone 10_2 and the second drones 11A_2 and 11B_2 are in charge of a second flight range FR_2. The first drone 10_3 and the second drones 11A_3 and 11B_3 are in charge of a third flight range FR_3. As described above, the flight ranges FR are set for the first drones 10 and the second drones 11 in advance.

The first drones 10, the second drones 11, and the disaster information processing server 12 are connected to each other via a network 13 to be communicable with each other. The first drones 10 and the second drones 11 are wirelessly connected to the network 13. The disaster information processing server 12 is connected to the network 13 in a wired or wireless manner. The network 13 is a wide area network (WAN) of, for example, the Internet, a public communication network, or the like. In a case where WAN is used, it is preferable to construct a virtual private network (VPN) or to use a communication protocol having a high security level such as Hypertext Transform Protocol Secure (HTTPS) in consideration of information security.

The disaster information processing server 12 is installed at, for example, a disaster response headquarters (agency, government office, or the like) of a local government such as a prefecture or a municipality. The disaster information processing server 12 is an example of a "disaster information processing apparatus" according to the disclosed technology.

A client terminal 14 is also connected to the network 13 in a wired or wireless manner. The client terminal 14 is, for example, a desktop personal computer owned by a staff member of the disaster response headquarters and has a display 15 and an input device 16. Various screens are displayed on the display 15. The input device 16 is a keyboard, a mouse, a touch panel, a microphone, or the like. Although only one client terminal 14 is drawn in FIG. 1, of course, a plurality of client terminals 14 may be provided.

Figure 2:
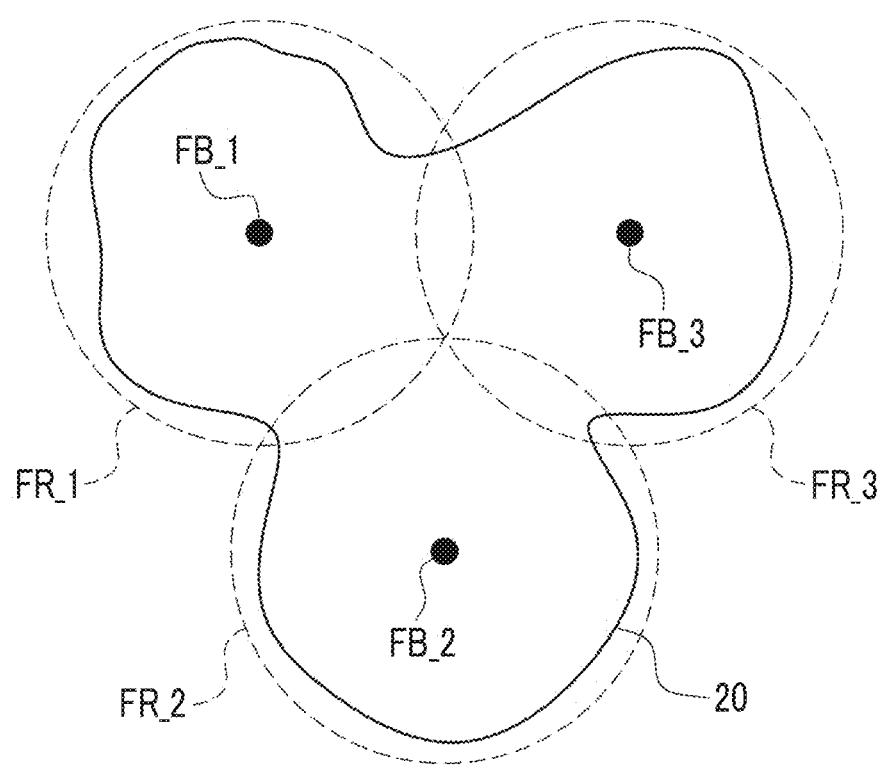
FIG. 2 is a diagram showing a relationship between an area and a flight range.

As shown in FIG. 2 in which an area 20 such as a prefecture or a municipality is viewed from above, the flight ranges FR are, for example, circles with a radius of 5 km to 10 km, and are set in advance to cover the entire area 20. The flight ranges FR may partially overlap as shown in the drawing. The flight range FR has a departure and arrival base FB of the first drone 10 and the second drone 11 at a center thereof. More specifically, the first flight range FR_1 has a first departure and arrival base FB_1, a second flight range FR_2 has a second departure and arrival base FB_2, and a third flight range FR_3 has a third departure and arrival base FB_3. The area 20 is an area where the disaster response headquarters is located due to the disaster, and is an example of a "disaster-stricken area" according to the disclosed technology.

Figure 3:
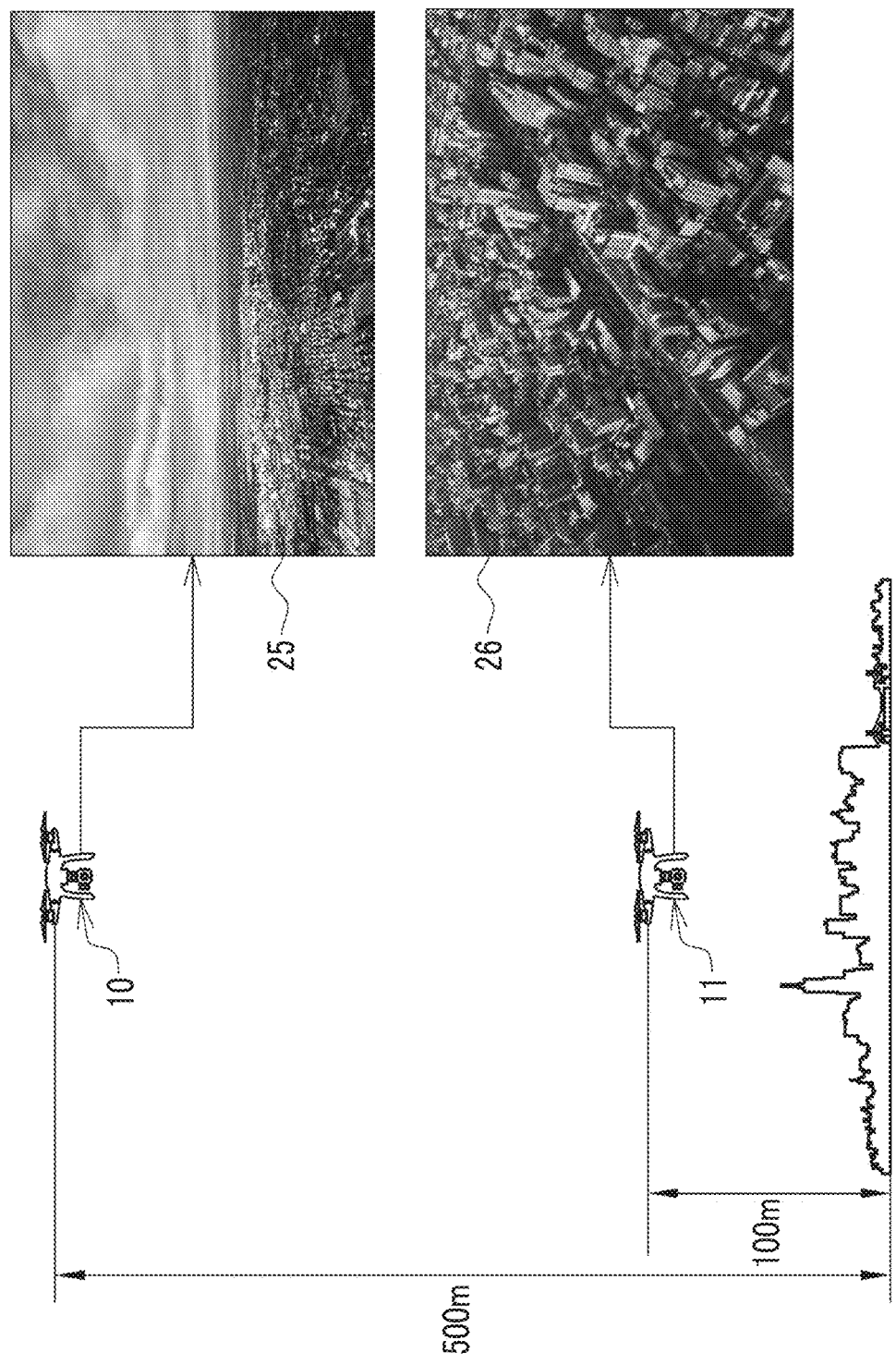
FIG. 3 is a diagram showing flight altitudes of a first drone and a second drone.

As an example, as shown in FIG. 3, the first drone 10 takes off from the departure and arrival base FB prior to the second drone 11, and captures a first aerial image 25 from, for example, a flight altitude of 500 m. After the first aerial image 25 is captured, the first drone 10 returns to the departure and arrival base FB. In contrast, the second drone 11 takes off from the departure and arrival base FB after the first drone 10, and captures a second aerial image 26 from, for example, a flight altitude of 100 m. After the second aerial image 26 is captured, the second drone 11 returns to the departure and arrival base FB. The first drone 10 and the second drone 11 capture the first aerial image 25 and the second aerial image 26 by setting a zoom magnification to the same value, for example, 1×. Thus, relatively many buildings appear relatively small in the first aerial image 25. In contrast, in the second aerial image 26, relatively few buildings appear relatively large.

Figure 4:
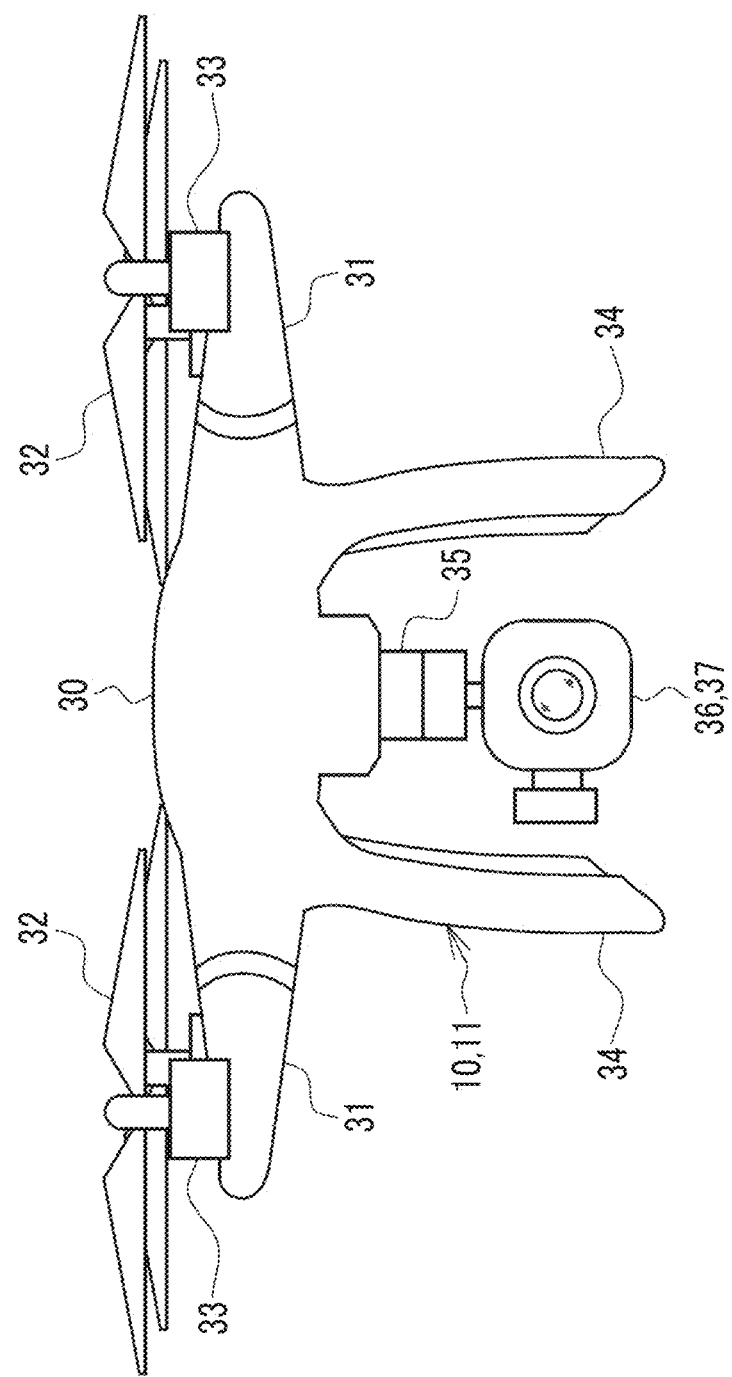
FIG. 4 is a diagram showing the first drone or the second drone.

As an example, as shown in FIG. 4, the first drone 10 or the second drone 11 includes an airframe 30, arms 31, propellers 32, motors 33, skids 34, a gimbal 35, a first camera 36 or a second camera 37, and the like. The first camera 36 is mounted on the first drone 10, and the second camera 37 is mounted on the second drone 11. The propellers 32 are also called blades or rotary wings. The motors 33 are also called rotors.

The arms 31 are four rod-like bodies extending from the airframe 30 in four directions symmetrical in a lateral direction. A total of four propellers 32 are provided at tip parts of the arms 31 one by one. The motor 33 is attached to the propeller 32. The motor 33 rotates the propeller 32 to fly the first drone 10 or the second drone 11. The motor 33 changes a flight direction of the first drone 10 or the second drone 11 by changing a rotation direction and a rotation speed thereof.

The skids 34 are four rod-like bodies extending from the airframe 30 in four directions symmetrical in a downward direction. The skids 34 are provided to allow the first drone 10 or the second drone 11 to stably land on the ground. The gimbal 35 holds the first camera 36 or the second camera 37 in a tiltable manner at a lower part of the airframe 30. The gimbal 35 reduces shaking generated in the airframe 30 during flight not to be transmitted to the first camera 36 or the second camera 37.

Figure 5:
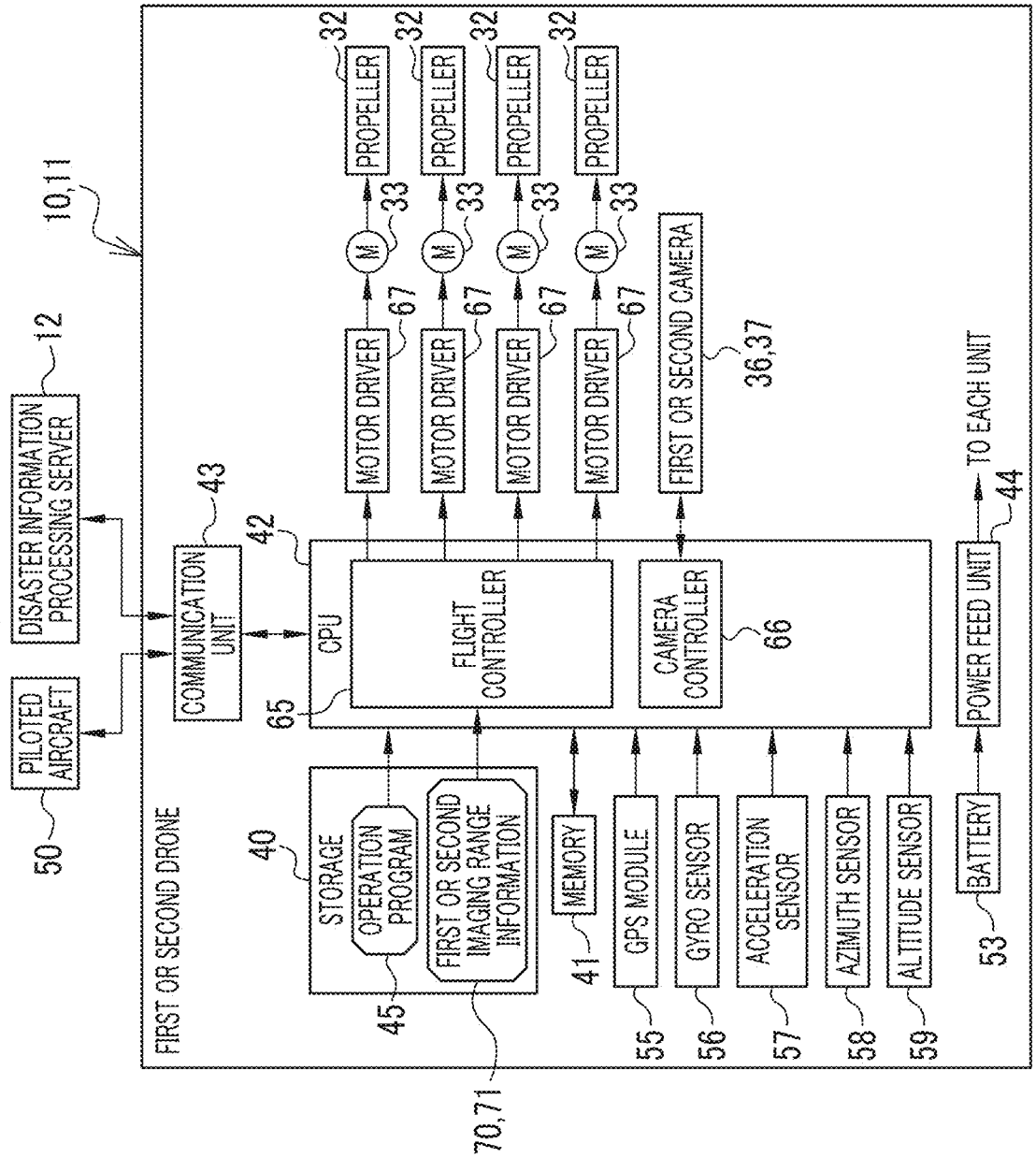
FIG. 5 is a block diagram of the first drone or the second drone.

As an example, as shown in FIG. 5, the first drone 10 or the second drone 11 includes a storage 40, a memory 41, a central processing unit (CPU) 42, a communication unit 43, a power feed unit 44, and the like.

The memory 41 is a work memory for the CPU 42 to execute processing. The CPU 42 loads an operation program 45 stored in the storage 40 into the memory 41 and executes processing corresponding to the operation program 45. Accordingly, the CPU 42 comprehensively controls an operation of each unit of the first drone 10 or the second drone 11.

The communication unit 43 is responsible for wireless communication with the disaster information processing server 12 and a piloted aircraft 50. The piloted aircraft 50 is operated by an operator of the first drone 10 or the second drone 11. The first drone 10 or the second drone 11 is basically an autonomous flight, but can be manually operated by the piloted aircraft 50 in order to respond to an emergency. The piloted aircraft 50 is also referred to as a proportional system, or a radio for short.

A rechargeable battery 53 such as a secondary battery is connected to the power feed unit 44. The power feed unit 44 feeds power from the battery 53 to each unit.

A Global Positioning System (GPS) module 55, a gyro sensor 56, an acceleration sensor 57, an azimuth sensor 58, an altitude sensor 59, and the like are connected to the CPU 42.

The GPS module 55 receives a signal from a GPS satellite and specifies longitude and latitude of a position of the first drone 10 or the second drone 11 based on the received signal. The GPS module 55 outputs the specified longitude and latitude to the CPU 42.

The gyro sensor 56 detects an inclination angle representing a pose of the first drone 10 or the second drone 11. The gyro sensor 56 outputs the detected inclination angle to the CPU 42. The acceleration sensor 57 detects an acceleration of the first drone 10 or the second drone 11. The acceleration sensor 57 outputs the detected acceleration to the CPU 42. A speed of the first drone 10 or the second drone 11 may be calculated by integrating the acceleration detected by the acceleration sensor 57.

The azimuth sensor 58 detects an angle representing azimuth in which a front surface of the first drone 10 or the second drone 11 faces, that is, an azimuthal angle, based on geomagnetism. The azimuth sensor 58 outputs the detected azimuthal angle to the CPU 42. The front surface of the first drone 10 or the second drone 11 is a side on which a lens optical axis of the first camera 36 or the second camera 37 faces.

The altitude sensor 59 detects the flight altitude of the first drone 10 or the second drone 11. The altitude sensor 59 is, for example, a sensor that measures an air pressure and converts the air pressure into flight altitude. The altitude sensor 59 may be a sensor that irradiates a ground surface with an infrared laser beam, receives reflected light thereof, and measures a distance from the ground surface based on the received reflected light. Alternatively, the altitude sensor 59 may be an ultrasound sensor that irradiates the ground surface with ultrasonic waves, receives an echo thereof, and measures a distance from the ground surface based on the received echo. The altitude sensor 59 outputs the detected flight altitude to the CPU 42.

In a case where the first drone 10 or the second drone 11 is powered on to activate the operation program 45, the CPU 42 functions as a flight controller 65 and a camera controller 66. The flight controller 65 controls an operation of the motor 33 via a motor driver 67. The camera controller 66 controls an operation of the first camera 36 or the second camera 37 to cause the first camera 36 to capture the first aerial image 25 and the second camera 37 to capture the second aerial image 26. The camera controller 66 receives the first aerial image 25 or the second aerial image 26 from the first camera 36 or the second camera 37, performs image processing on the first aerial image 25 or the second aerial image 26, and then transmits the first aerial image 25 or the second aerial image 26 to the disaster information processing server 12 via the communication unit 43.

The storage 40 stores a first imaging range information 70 or a second imaging range information 71. More specifically, the storage 40 of the first drone 10 stores the first imaging range information 70, and the storage 40 of the second drone 11 stores the second imaging range information 71. The first imaging range information 70 is stored in the storage 40 of the first drone 10 in advance before the occurrence of the disaster. In contrast, the second imaging range information 71 is transmitted from the disaster information processing server 12 to the second drone 11 after the occurrence of the disaster, and is stored in the storage 40 of the second drone 11. The flight controller 65 performs control corresponding to the first imaging range information 70 or the second imaging range information 71 while referring to various kinds of input data from the GPS module 55, the gyro sensor 56, the acceleration sensor 57, the azimuth sensor 58, the altitude sensor 59, and the like.

Figures 6, 7:
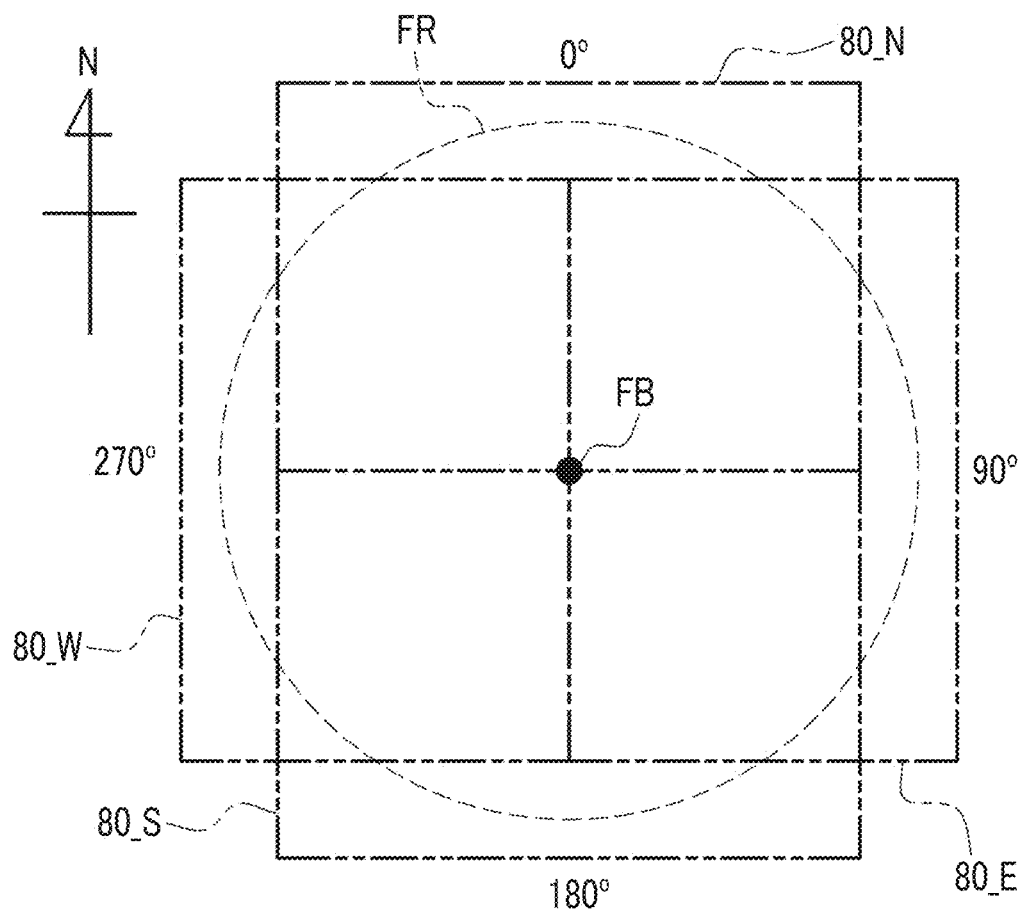
FIG. 6 is a diagram showing first imaging range information.
FIG. 7 is a diagram showing a relationship between a flight range and a first imaging range.

As an example, as shown in FIG. 6, the first imaging range information 70 is information on a first imaging range 80 (see FIG. 7) which is an imaging range of the first aerial image 25 of the first camera 36. Specifically, the first imaging range information 70 includes items of longitude and latitude, azimuth, and altitude. For example, longitude and latitude in the sky above the departure and arrival base FB is registered in the item of latitude and longitude. For example, four azimuthal angles of 0° (north), 90° (east), 180° (south), and 270° (west) are registered in the item of azimuth. For example, 500 m shown in FIG. 3 is registered as the item of altitude.

As an example, as shown in FIG. 7, the first imaging range 80 defined by the first imaging range information 70 has a rectangular shape and has four first imaging ranges 80_N, 80_E, 80_S, and 80_W. The first imaging ranges 80_N, 80_E, 80_S, and 80_W cover the entire flight range FR. The first imaging range 80_N is an imaging range in a case where the azimuthal angle of the first drone 10 is 0°. Similarly, the first imaging range 80_E is an imaging range in a case where the azimuthal angle of the first drone 10 is 90°, the first imaging range 80_S is an imaging range in a case where the azimuthal angle of the first drone 10 is 180°, and the first imaging range 80_W is an imaging range in a case where the azimuthal angle of the first drone 10 is 270°. All of the first imaging ranges 80_N, 80_E, 80_S, and 80_W are imaging ranges in a case where the departure and arrival base FB is viewed directly below by the first camera 36.

The flight controller 65 of the first drone 10 first causes the first drone 10 to fly to a position 500 m above the departure and arrival base FB according to the first imaging range information 70. The azimuthal angles are sequentially changed to 0°, 90°, 180°, and 270° while the first drone 10 is hovered at a position 500 m above the departure and arrival base FB. The camera controller 66 of the first drone 10 captures the first imaging ranges 80_N, 80_E, 80_S, and 80_W at the azimuthal angles of 0°, 90°, 180°, and 270°, and captures a total of four first aerial images 25.

A range in which damage situations of buildings appearing in the first aerial image 25 can be analyzed is set as the first imaging range 80. The first imaging range 80 varies according to the flight altitude of the first drone 10, a resolution of the first camera 36, an angle of view of the first camera 36, and the like. Thus, there are cases where the entire flight range FR is covered by the plurality of first imaging ranges 80 as in the example of FIG. 7, and there are cases where the entire flight range FR can be covered by one first imaging range 80.

Figure 8:
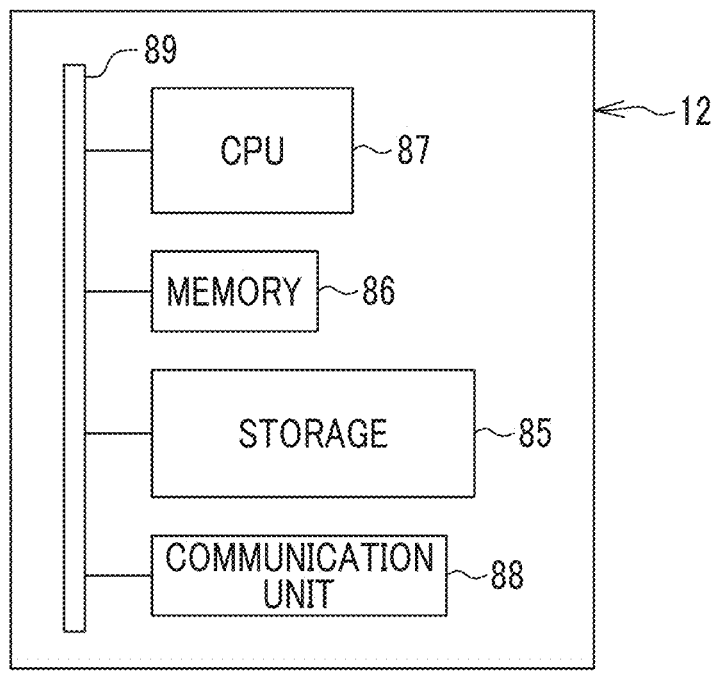
FIG. 8 is a block diagram showing a computer constituting a disaster information processing server.

As an example, as shown in FIG. 8, a computer constituting the disaster information processing server 12 comprises a storage 85, a memory 86, a central processing unit (CPU) 87, and a communication unit 88. These components are interconnected via a busline 89. The CPU 87 is an example of a "processor" according to the disclosed technology.

The storage 85 is a hard disk drive built in the computer constituting the disaster information processing server 12 or connected via a cable or the network 13. Alternatively, the storage 85 is a disk array in which a plurality of hard disk drives are connected in series. The storage 85 stores a control program such as an operating system, various application programs, various kinds of data associated with these programs, and the like. A solid state drive may be used instead of the hard disk drive.

The memory 86 is a work memory for the CPU 87 to execute processing. The CPU 87 loads the program stored in the storage 85 into the memory 86 and executes processing corresponding to the program. Accordingly, the CPU 87 comprehensively controls an operation of each unit of the computer. The communication unit 88 performs transmission control of various kinds of information to external devices such as the first drone 10 and the second drone 11. The memory 86 may be built in the CPU 87.

Figure 9:
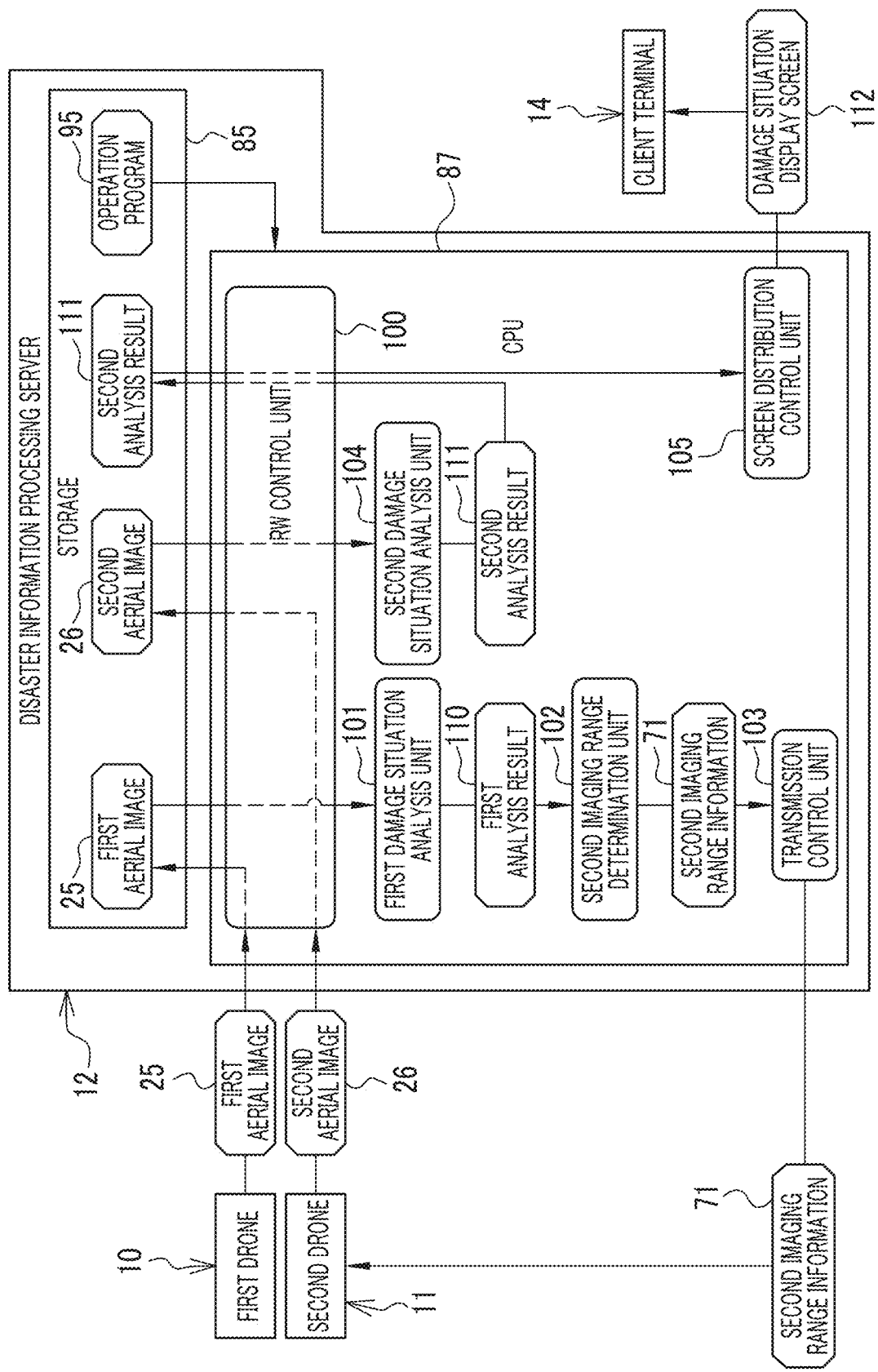
FIG. 9 is a block diagram showing a processing unit of a CPU of the disaster information processing server.

As an example, as shown in FIG. 9, an operation program 95 is stored in the storage 85 of the disaster information processing server 12. The operation program 95 is an application program for causing the computer to function as the disaster information processing server 12. That is, the operation program 95 is an example of an "operation program of a disaster information processing apparatus" according to the disclosed technology.

In a case where the operation program 95 is started, the CPU 87 of the computer constituting the disaster information processing server 12 functions as a read and write (hereinafter, abbreviated as RW) control unit 100, a first damage situation analysis unit 101, a second imaging range determination unit 102, a transmission control unit 103, a second damage situation analysis unit 104, and a screen distribution control unit 105 in cooperation with the memory 86 and the like.

The RW control unit 100 controls the storage of various kinds of data in the storage 85 and the reading-out of various kinds of data in the storage 85. For example, the RW control unit 100 receives the first aerial image 25 from the first drone 10 and stores the received first aerial image 25 in the storage 85. The RW control unit 100 receives the second aerial image 26 from the second drone 11 and stores the received second aerial image 26 in the storage 85.

The RW control unit 100 reads out the first aerial image 25 from the storage 85 and outputs the read-out first aerial image 25 to the first damage situation analysis unit 101. The RW control unit 100 reads out the second aerial image 26 from the storage 85 and outputs the read-out second aerial image 26 to the second damage situation analysis unit 104.

The first damage situation analysis unit 101 analyzes a first damage situation 127 (see FIG. 10) of the disaster in the first imaging range 80 based on the first aerial image 25. The first damage situation analysis unit 101 outputs an analysis result (hereinafter, abbreviated as a first analysis result) 110 of the first damage situation 127 to the second imaging range determination unit 102.

The second imaging range determination unit 102 determines a second imaging range 136 (see FIG. 13) of the second camera 37 of the second drone 11 based on the first analysis result 110. The second imaging range determination unit 102 outputs the second imaging range information 71 which is information on the determined second imaging range 136 to the transmission control unit 103. The transmission control unit 103 performs control such that the second imaging range information 71 is transmitted to the second drone 11.

The second damage situation analysis unit 104 analyzes a second damage situation 148 (see FIG. 14) of the disaster in the second imaging range 136 based on the second aerial image 26. The second damage situation analysis unit 104 outputs an analysis result (hereinafter, abbreviated as a second analysis result) 111 of the second damage situation 148 to the RW control unit 100. The RW control unit 100 stores the second analysis result 111 in the storage 85.

In a case where a distribution request (not shown) from the client terminal 14 is received, the RW control unit 100 reads out the second analysis result 111 from the storage 85 and outputs the read-out second analysis result 111 to the screen distribution control unit 105. The screen distribution control unit 105 generates a damage situation display screen 112 based on the second analysis result 111. The screen distribution control unit 105 performs control such that screen data of the generated damage situation display screen 112 is distributed to the client terminal 14 that is a request source of the distribution request. The screen data is, for example, screen data for web distribution created by a markup language such as Extensible Markup Language (XML). The client terminal 14 reproduces and displays the damage situation display screen 112 on a web browser based on the screen data. Another data description language such as JSON (Javascript (registered trademark) Object Notation) may be used instead of XML.

Figure 10:
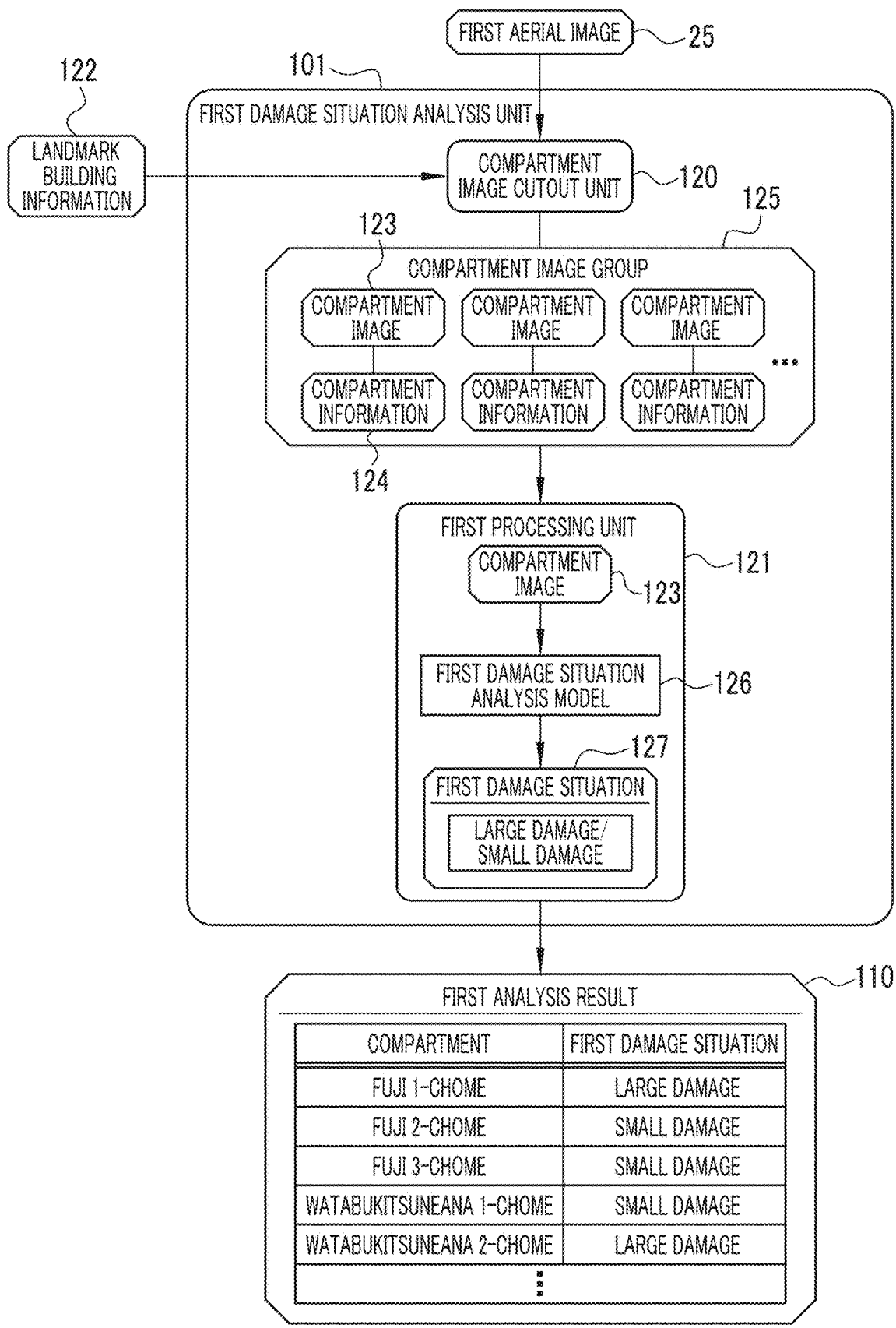
FIG. 10 is a block diagram showing details of a first damage situation analysis unit.

As an example, as shown in FIG. 10, the first damage situation analysis unit 101 includes a compartment image cutout unit 120 and a first processing unit 121. The compartment image cutout unit 120 cuts out a compartment image 123 for each compartment 135 (see FIG. 13) from the first aerial image 25 while referring to landmark building information 122. The compartment 135 is a plurality of regions obtained by dividing the area 20, and is a region including a plurality of adjacent buildings. In the present example, the compartment 135 is a chome such as "Fuji 1-chome" or "Watabukitsuneana 2-chome". The compartment image cutout unit 120 outputs a compartment image group 125 including a plurality of sets of the compartment image 123 and compartment information 124 representing the compartment 135 of the compartment image 123 to the first processing unit 121.

The landmark building information 122 is stored in the storage 85, is read out from the storage 85 by the RW control unit 100, and is output to the compartment image cutout unit 120. The landmark building information 122 includes aerial images of landmark buildings which are buildings positioned at a corner of each compartment 135, and the compartment information 124 of the compartment 135 to which the landmark buildings belong. The compartment image cutout unit 120 finds the landmark building from the first aerial image 25 by using a well-known image recognition technology and relying on the aerial images of the landmark buildings. A region surrounded by a line connecting the found landmark buildings is cut out as the compartment image 123 from the first aerial image 25.

The first processing unit 121 inputs the compartment image 123 into a first damage situation analysis model 126. The first damage situation 127 is output from the first damage situation analysis model 126. The first damage situation 127 is any one of "large damage" or "small damage". The first processing unit 121 outputs the first damage situation 127 from the first damage situation analysis model 126 for all the compartment images 123 included in the compartment image group 125. The first processing unit 121 outputs a first analysis result 110 in which the first damage situation 127 for each compartment 135 is summarized. FIG. 10 illustrates a case where the first damage situations 127 of the compartments 135 such as "Fuji 1-chome" and "Watabukitsuneana 2-chome" are "large damage".

The first damage situation analysis model 126 is a machine learning model constructed by a method such as a neural network, a support vector machine, or boosting. The first damage situation analysis model 126 is stored in the storage 85, is read out from the storage 85 by the RW control unit 100, and is output to the first processing unit 121.

Figure 11:
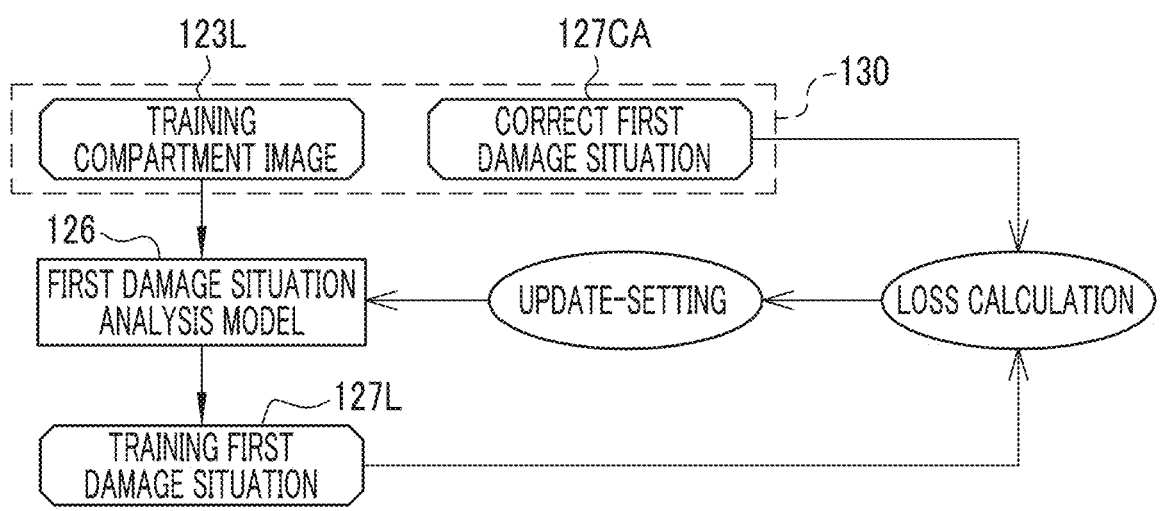
FIG. 11 is a diagram showing an outline of processing in a training phase of a first damage situation analysis model.

As an example, as shown in FIG. 11, in a training phase, the first damage situation analysis model 126 is trained by being given training data 130. The training data 130 is a set of a training compartment image 123L and a correct first damage situation 127CA corresponding to the training compartment image 123L. The training compartment image 123L is obtained by inputting the first aerial image 25 of a certain area 20 into the compartment image cutout unit 120. The correct first damage situation 127CA is a result of actually discriminating the first damage situation 127 of the compartment 135 appearing in the training compartment image 123L by a qualified person such as a house damage certified person.

In the training phase, the training compartment image 123L is input to the first damage situation analysis model 126. The first damage situation analysis model 126 outputs a training first damage situation 127L to the training compartment image 123L. Loss calculation of the first damage situation analysis model 126 using a loss function is performed based on the training first damage situation 127L and the correct first damage situation 127CA. Various coefficients of the first damage situation analysis model 126 are update-set according to a result of the loss calculation, and the first damage situation analysis model 126 is updated according to the update-setting.

In the training phase of the first damage situation analysis model 126, the series of processing of the input of the training compartment image 123L into the first damage situation analysis model 126, the output of the training first damage situation 127L from the first damage situation analysis model 126, the loss calculation, the update-setting, and the updating of the first damage situation analysis model 126 are repeatedly performed while the training data 130 is being exchanged. The repetition of the series of processing is ended in a case where discrimination accuracy of the training first damage situation 127L for the correct first damage situation 127CA reaches a predetermined set level. The first damage situation analysis model 126 in which the discrimination accuracy reaches the set level is stored in the storage 85 and is used by the first processing unit 121.

Figure 12:
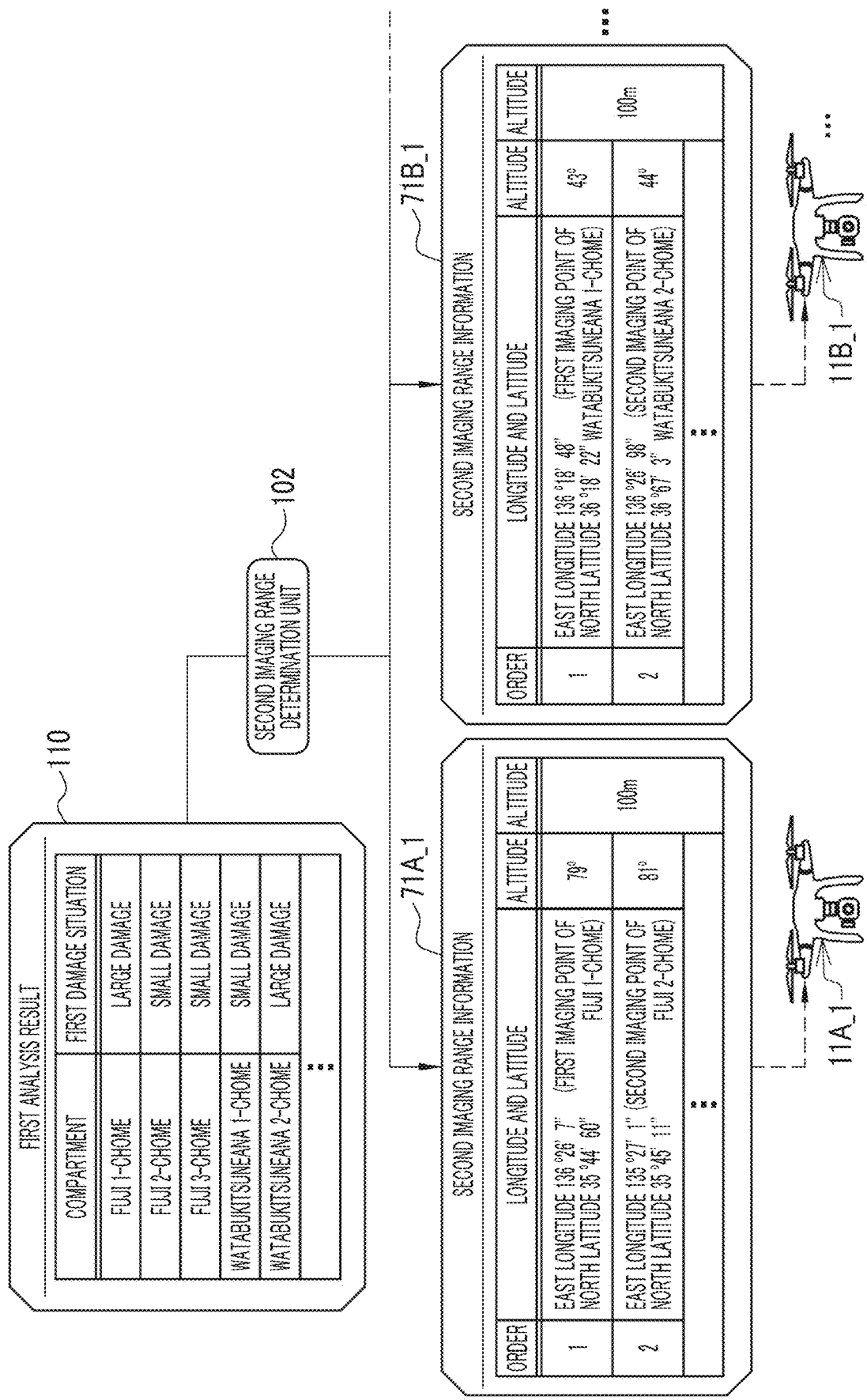
FIG. 12 is a diagram showing processing of a second imaging range determination unit.

As an example, as shown in FIG. 12, the second imaging range determination unit 102 determines, as the second imaging range 136, an imaging range including regions where damage is determined to be relatively large as a result of the analysis of the first damage situation 127. In the present example, the regions where damage is determined to be relatively large are the compartments 135 such as "Fuji 1-chome" and "Watabukitsuneana 2-chome" of which the first damage situation 127 is determined to be "large damage" by the first damage situation analysis model 126.

Figure 13:
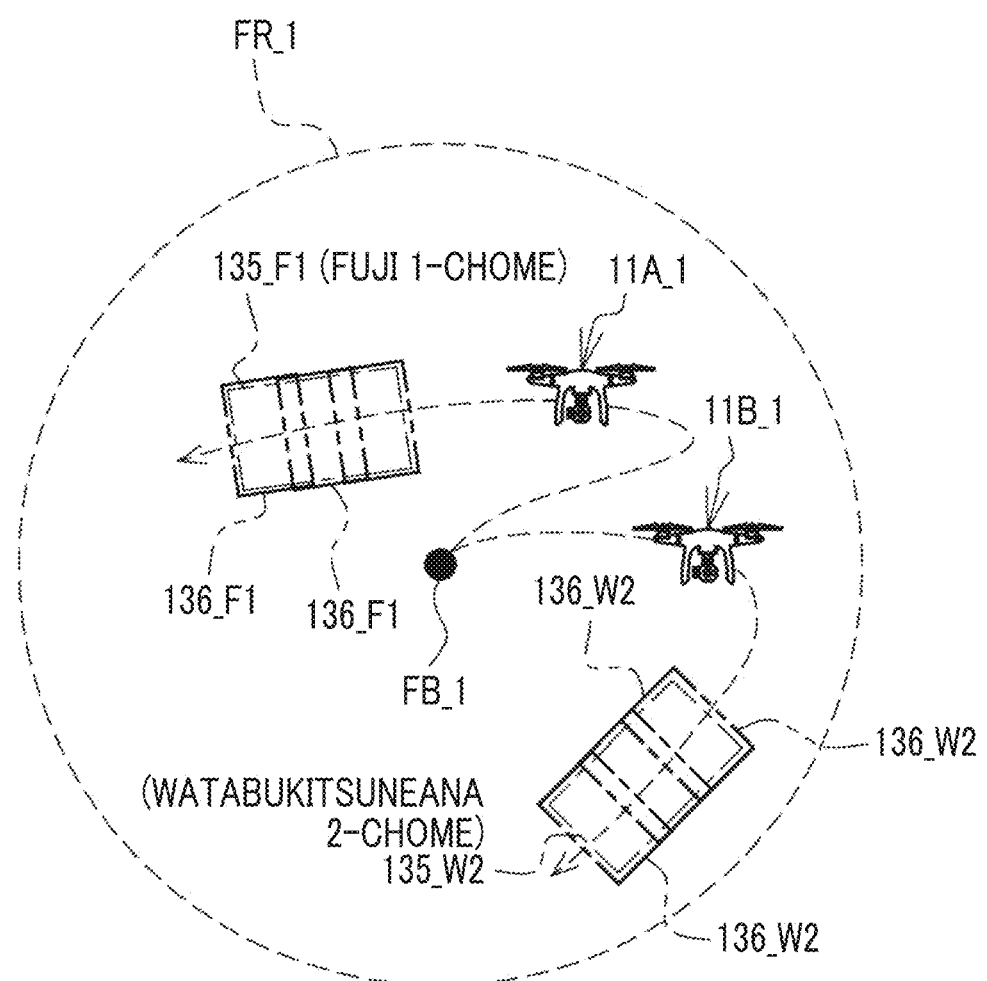
FIG. 13 is a diagram showing a relationship between a compartment and a second imaging range.

Here, a compartment 135_F1 of "Fuji 1-chome" and a compartment 135_W2 of "Watabukitsuneana 2-chome" are included in the flight range FR_1 in charge of the second drones 11A_1 and 11B_1 (see FIG. 13). In this case, the second imaging range determination unit 102 prepares second imaging range information 71A_1 that registers longitudes and latitudes and azimuthal angles of a plurality of imaging points corresponding to a plurality of second imaging ranges 136_F1 that cover the compartment 135_F1 of "Fuji 1-chome". The second imaging range determination unit 102 prepares second imaging range information 71B_1 that registers longitudes and latitudes and azimuthal angles of a plurality of imaging points corresponding to a plurality of second imaging ranges 136_W2 that cover the compartment 135_W2 of "Watabukitsuneana 2-chome". For example, 100 m shown in FIG. 3 is registered in the items of altitude of the pieces of second imaging range information 71A_1 and 71B_1.

The transmission control unit 103 transmits the second imaging range information 71A_1 which is information on the second imaging range 136_F1 that covers the compartment 135_F1 of "Fuji 1-chome" to the second drone 11A_1. The transmission control unit 103 transmits the second imaging range information 71B_1 which is information on the second imaging range 136_W2 that covers the compartment 135_W2 of "Watabukitsuneana 2-chome" to the second drone 11B_1. As described above, the second imaging range determination unit 102 determines the second imaging range 136 for each of two second drones 11A_1 and 11B_1.

In FIG. 13 showing an example of a relationship between the compartment 135 and the second imaging range 136, the flight controller 65 of the second drone 11A_1 causes the second drone 11A_1 to sequentially fly to the imaging points of the compartment 135_F1 of "Fuji 1-chome" according to the second imaging range information 71A_1. The camera controller 66 of the second drone 11A_1 captures the second imaging range 136_F1 at the imaging points and captures a plurality of second aerial images 26. Similarly, the flight controller 65 of the second drone 11B_1 causes the second drone 11B_1 to sequentially fly to the imaging points of the compartment 135_W2 of "Watabukitsuneana 2-chome" according to the second imaging range information 71B_1. The camera controller 66 of the second drone 11B_1 captures the second imaging range 136_W2 at the imaging points and captures a plurality of second aerial images 26.

Here, the second imaging range 136 is a range that is relatively narrower than the first imaging range 80, as can be seen in comparison with the first imaging range 80 shown in FIG. 7. The second imaging range 136 is a range having a size of, for example, ⅕ to 1/10 of the first imaging range 80.

Figure 14:
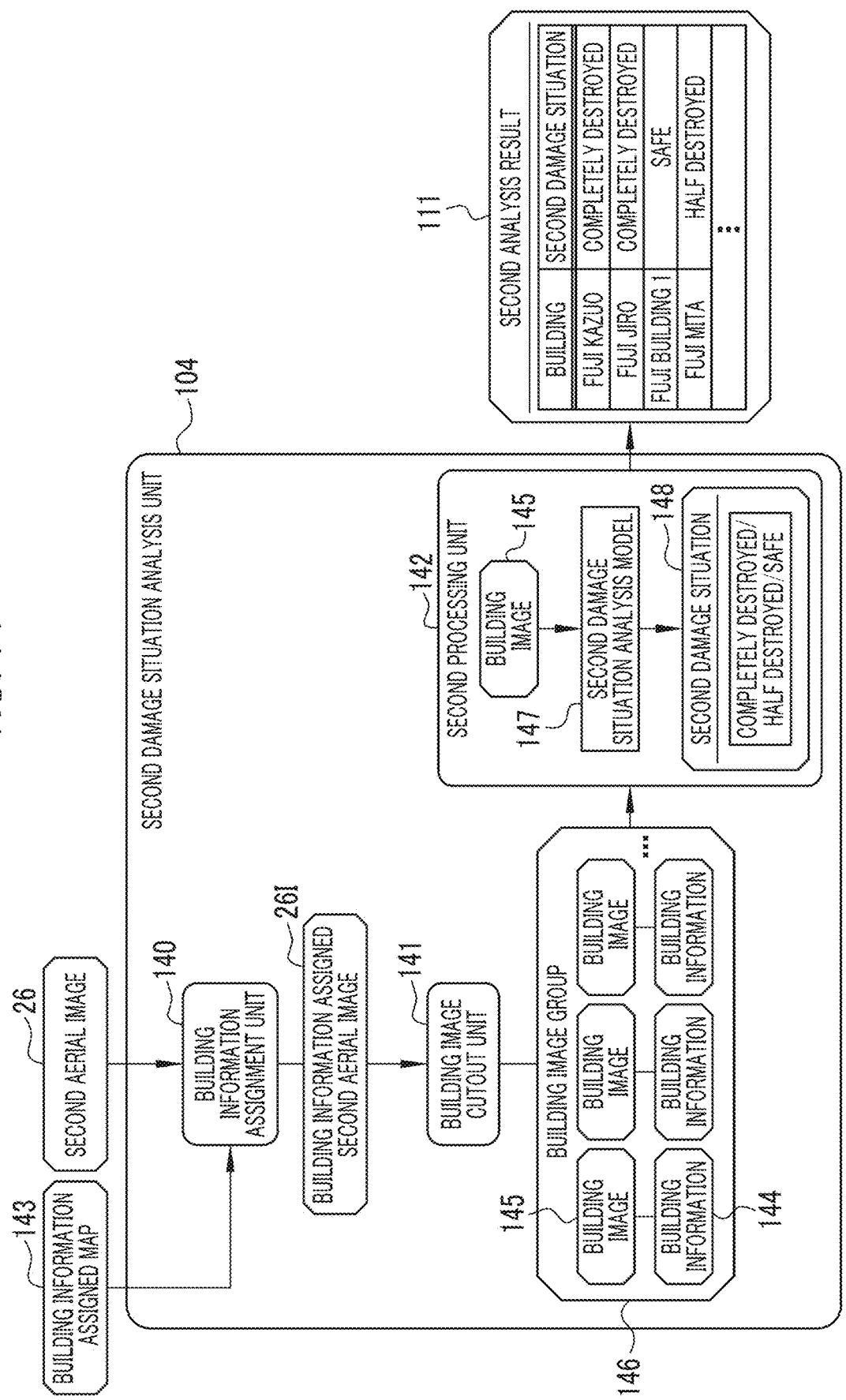
FIG. 14 is a block diagram showing details of a second damage situation analysis unit.

As an example, as shown in FIG. 14, the second damage situation analysis unit 104 includes a building information assignment unit 140, a building image cutout unit 141, and a second processing unit 142. The building information assignment unit 140 assigns building information 144 to each building appearing in the second aerial image 26 while referring to a building information assigned map 143, and uses the second aerial image 26 as a building information assigned second aerial image 261. The building information assignment unit 140 outputs the building information assigned second aerial image 261 to the building image cutout unit 141.

The building information assigned map 143 is stored in the storage 85, is read out from the storage 85 by the RW control unit 100, and is output to the building information assignment unit 140. The building information assigned map 143 is a three-dimensional map of the area 20, and features points such as corners of a roof and the building information 144 are associated with each building. Specifically, the building information 144 is a name of an owner of a building (house) such as "Fuji Kazuo" or a name of a building such as "Fuji Building 1". The building information 144 also includes an address of the building.

The building information assignment unit 140 adjusts an orientation of the building on the building information assigned map 143 to an orientation of the building appearing in the second aerial image 26 based on longitude and latitude, azimuth, and altitude of the second drone 11 in a case where the second aerial image 26 is captured, a tilt angle of the second camera 37, and the like. The building information assignment unit 140 extracts feature points such as corners of a roof of a building appearing in the second aerial image 26. The building information assignment unit 140 matches the building information assigned map 143 and the second aerial image 26 according to the orientation of the building appearing in the second aerial image 26, and searches for a position where a correlation between feature points of the building information assigned map 143 and feature points of the second aerial image 26 is highest. At the position where the correlation is highest, the building information 144 of the building information assigned map 143 is added to each building of the second aerial image 26.

The building image cutout unit 141 cuts out building images 145 from the building information assigned second aerial image 261 by using, for example, a machine learning model (not shown) using the aerial image as an input image and the image of each building appearing in the aerial image as an output image. The building image cutout unit 141 outputs a building image group 146 including a plurality of sets of the building image 145 and the building information 144 to the second processing unit 142.

The second processing unit 142 inputs the building images 145 into a second damage situation analysis model 147. The second damage situation 148 is output from the second damage situation analysis model 147. The second damage situation 148 assumes an earthquake or the like as the disaster, and is any one of "completely destroyed", "half destroyed", or "safe". The second processing unit 142 outputs the second damage situation 148 from the second damage situation analysis model 147 for all the building images 145 included in the building image group 146. The second processing unit 142 outputs the second analysis result 111 in which the second damage situation 148 for each building is summarized. In FIG. 14, a case where the second damage situations 148 of the buildings of "Fuji Kazuo" and "Fuji Jiro" are "completely destroyed", the second damage situation 148 of the building of "Fuji Mita" is "half destroyed", and the second damage situation 148 of "Fuji Building 1" is "safe" is illustrated.

Similar to the first damage situation analysis model 126, the second damage situation analysis model 147 is a machine learning model constructed by a method such as a neural network, a support vector machine, or boosting. The second damage situation analysis model 147 is stored in the storage 85, is read out from the storage 85 by the RW control unit 100, and is output to the second processing unit 142.

Figure 15:
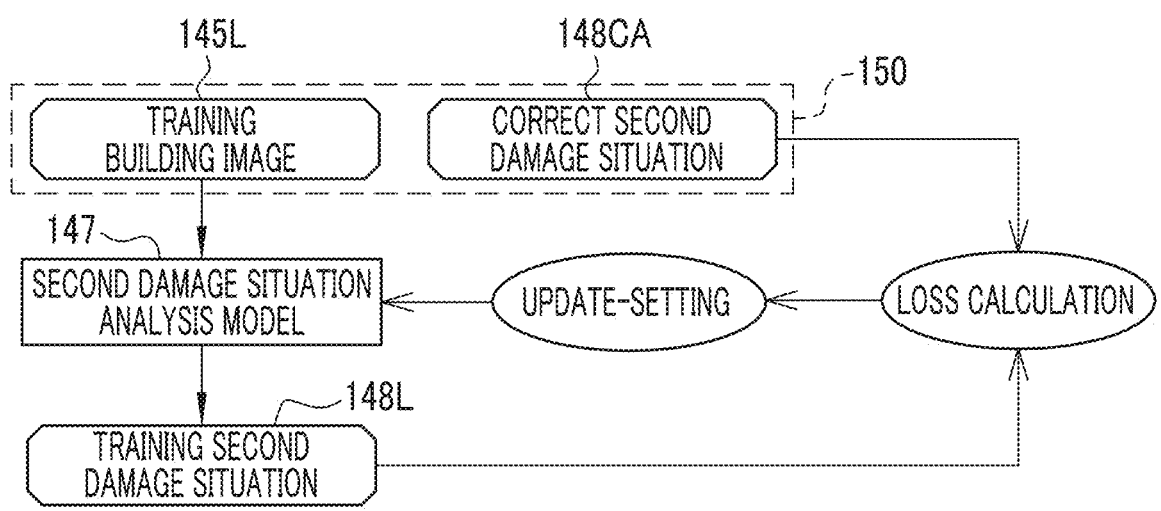
FIG. 15 is a diagram showing an outline of processing in a training phase of a second damage situation analysis model.

As an example, as shown in FIG. 15, in the training phase, the second damage situation analysis model 147 is trained by being given training data 150. The training data 150 is a set of a training building image 145L and a correct second damage situation 148CA corresponding to the training building image 145L. The training building image 145L is obtained by inputting the second aerial image 26 of a certain area 20 into the building image cutout unit 141. The correct second damage situation 148CA is a result of actually discriminating the second damage situation 148 of the building appearing in the training building image 145L by a qualified person such as a house damage certified person.

In the training phase, the training building image 145L is input to the second damage situation analysis model 147. The second damage situation analysis model 147 outputs a training second damage situation 148L to the training building image 145L. Loss calculation of the second damage situation analysis model 147 using a loss function is performed based on the training second damage situation 148L and the correct second damage situation 148CA. Various coefficients of the second damage situation analysis model 147 are update-set according to a result of the loss calculation, and the second damage situation analysis model 147 is updated according to the update-setting.

In the training phase of the second damage situation analysis model 147, the series of processing of the input of the training building image 145L into the second damage situation analysis model 147, the output of the training second damage situation 148L from the second damage situation analysis model 147, the loss calculation, the update-setting, and the updating of the second damage situation analysis model 147 are repeatedly performed while the training data 150 is being exchanged. The repetition of the series of processing is ended in a case where discrimination accuracy of the training second damage situation 148L for the correct second damage situation 148CA reaches a predetermined set level. The second damage situation analysis model 147 in which the discrimination accuracy reaches the set level is stored in the storage 85 and is used by the second processing unit 142.

Figure 16:
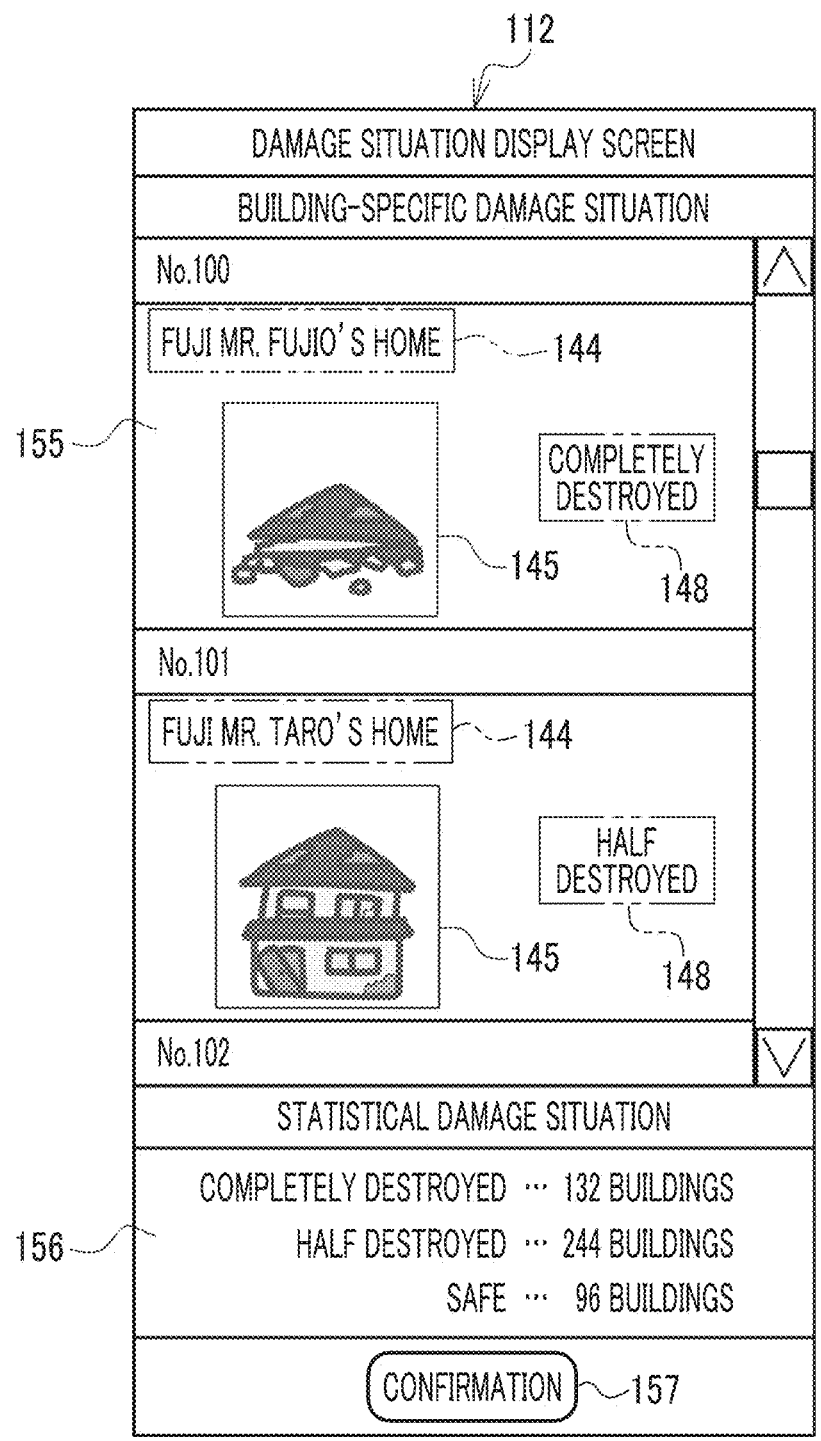
FIG. 16 is a diagram showing a damage situation display screen.

As an example, as shown in FIG. 16, the damage situation display screen 112 displayed on the display 15 of the client terminal 14 has a building-specific damage situation display region 155 and a statistical damage situation display region 156. The building information 144, the building image 145, and the second damage situation 148 of each building are displayed in the building-specific damage situation display region 155. In the statistical damage situation display area 156, the total number of each of completely destroyed, half destroyed, and safe buildings of the area 20 is displayed. In a case where a confirmation button 157 is selected, the display of the damage situation display screen 112 is erased. The building-specific damage situation display region 155 and/or the statistical damage situation display region 156 may be displayed separately for each flight range FR or for each compartment 135.

Next, actions of the above configuration will be described with reference to the flowcharts of FIGS. 17 and 18. First, in a case where the operation program 95 is started in the disaster information processing server 12, as shown in FIG. 9, the CPU 87 of the disaster information processing server 12 functions as the RW control unit 100, the first damage situation analysis unit 101, the second imaging range determination unit 102, the transmission control unit 103, the second damage situation analysis unit 104, and the screen distribution control unit 105. As shown in FIG. 10, the first damage situation analysis unit 101 includes the compartment image cutout unit 120 and the first processing unit 121. As shown in FIG. 14, the second damage situation analysis unit 104 includes the building information assignment unit 140, the building image cutout unit 141, and the second processing unit 142.

In a case where the disaster occurs in the area 20, the first imaging range 80 is captured by the first camera 36 mounted on the first drone 10 as shown in FIG. 7 according to the first imaging range information 70 shown in FIG. 6, and as a result, the first aerial image 25 is obtained. The first aerial image 25 is transmitted from the first drone 10 to the disaster information processing server 12.

Figure 17:
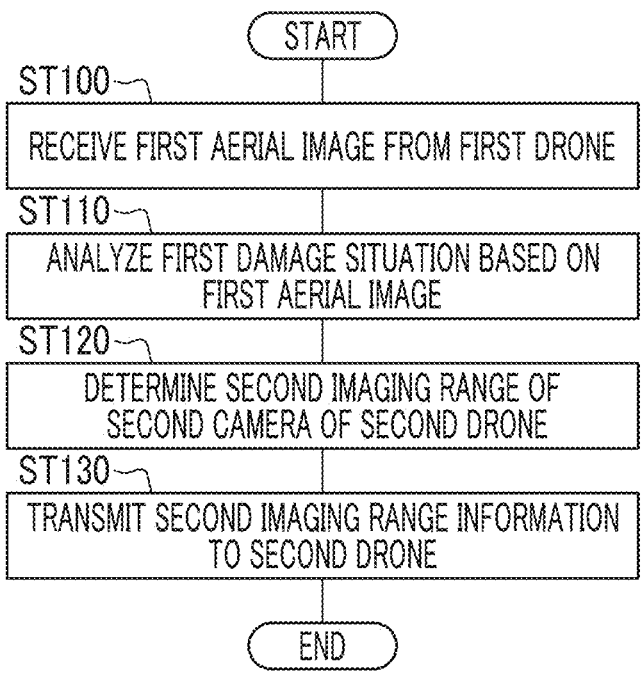
FIG. 17 is a diagram showing a processing procedure of the disaster information processing server.

As an example, as shown in FIG. 17, in the disaster information processing server 12, the first aerial image 25 from the first drone 10 is received by the RW control unit 100 (step ST100). The first aerial image 25 is stored in the storage 85 by the RW control unit 100.

The first aerial image 25 is read out from the storage 85 by the RW control unit 100 and is output to the first damage situation analysis unit 101. As shown in FIG. 10, the first damage situation 127 of the disaster in the first imaging range 80 is analyzed by the first damage situation analysis unit 101 based on the first aerial image 25 (step ST110). At this time, the first damage situation 127 is analyzed by the first damage situation analysis unit 101 for each compartment 135 including the plurality of adjacent buildings. The analysis result of the first damage situation 127, that is, the first analysis result 110 is output from the first damage situation analysis unit 101 to the second imaging range determination unit 102.

As shown in FIG. 12, the second imaging range 136 of the second camera 37 of the second drone 11 is determined by the second imaging range determination unit 102 based on the first analysis result 110 (step ST120). At this time, the imaging range including the region where damage is determined to be relatively large as a result of the analysis of the first damage situation 127 is determined as the second imaging range 136 by the second imaging range determination unit 102. The flight altitude of the second drone 11 is set to be lower than the flight altitude of the first drone 10 by the second imaging range determination unit 102. The second imaging range 136 is determined by the second imaging range determination unit 102 for each of the two second drones 11.

The second imaging range information 71 which is the information on the second imaging range 136 is output from the second imaging range determination unit 102 to the transmission control unit 103. The second imaging range information 71 is transmitted to the second drone 11 by the transmission control unit 103 (step ST130).

Subsequently, according to the second imaging range information 71, the second imaging range 136 is captured by the second camera 37 mounted on the second drone 11 as shown in FIG. 13, and as a result, the second aerial image 26 is obtained. The second aerial image 26 is transmitted from the second drone 11 to the disaster information processing server 12.

Figure 18:
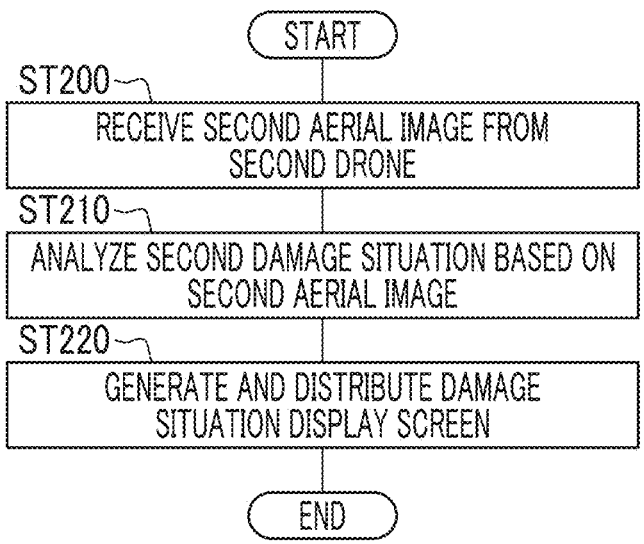
FIG. 18 is a diagram showing the processing procedure of the disaster information processing server.

As an example, as shown in FIG. 18, in the disaster information processing server 12, the second aerial image 26 from the second drone 11 is received by the RW control unit 100 (step ST200). The second aerial image 26 is stored in the storage 85 by the RW control unit 100.

The second aerial image 26 is read out from the storage 85 by the RW control unit 100 and is output to the second damage situation analysis unit 104. As shown in FIG. 14, the second damage situation 148 of the disaster in the second imaging range 136 is analyzed by the second damage situation analysis unit 104 based on the second aerial image 26 (step ST210). The analysis result of the second damage situation 148, that is, the second analysis result 111 is output from the second damage situation analysis unit 104 to the RW control unit 100 and is stored in the storage 85 by the RW control unit 100.

In a case where the distribution request from the client terminal 14 is received, the second analysis result 111 is read out from the storage 85 by the RW control unit 100 and is output to the screen distribution control unit 105. The damage situation display screen 112 shown in FIG. 16 is generated by the screen distribution control unit 105 based on the second analysis result 111. The screen data of the damage situation display screen 112 is distributed to the client terminal 14 of a distribution request source by the screen distribution control unit 105 (step ST220). The damage situation display screen 112 is displayed on the display 15 of the client terminal 14 that is the distribution request source, and is used for viewing by the staff member of the disaster response headquarters.

As described above, the CPU 87 of the disaster information processing server 12 comprises the RW control unit 100, the first damage situation analysis unit 101, and the second imaging range determination unit 102. The RW control unit 100 receives the first aerial image 25 obtained by capturing the first imaging range 80 including the area 20 by the first camera 36 mounted on the first drone 10. The first damage situation analysis unit 101 analyzes the first damage situation 127 of the disaster in the first imaging range 80 based on the first aerial image 25. The second imaging range determination unit 102 determines the second imaging range 136 of the second camera 37 mounted on the second drone 11 based on the first analysis result 110, and is the second imaging range 136 relatively narrower than the first imaging range 80.

As described above, in the disclosed technology, first, the first damage situation 127 which is a rough damage situation of the disaster is grasped by the first aerial image 25 in which a relatively wide first imaging range 80 appears. In light of the first damage situation 127, the second imaging range 136 for grasping the second damage situation 148 which is a detailed damage situation of the disaster is determined. Accordingly, it is possible to grasp the damage situation at the disaster site in a short time without waste as compared with a case where the plurality of drones are simply flown without any goal.

The second imaging range determination unit 102 determines, as the second imaging range 136, the imaging range including the region of the area 20 in which damage is determined to be relatively large as a result of the analysis of the first damage situation 127. There is a possibility that the region where damage is determined to be relatively large includes the disaster site. Thus, it is possible to more efficiently grasp the damage situation at the disaster site.

The RW control unit 100 receives the second aerial image 26 obtained by capturing the second imaging range 136 by the second camera 37 of the second drone 11. The second damage situation analysis unit 104 analyzes the second damage situation 148 of the disaster in the second imaging range 136 based on the second aerial image 26. Thus, it is possible to easily grasp the second damage situation 148 which is more detailed than the first damage situation 127 without performing a complicated investigation of actually walking around the disaster site.

The second imaging range determination unit 102 sets the flight altitude of the second drone 11 to be lower than the flight altitude of the first drone 10. Thus, the performance of the second camera 37 is higher than the performance of the first camera 36, and the second aerial image 26 which has a higher resolution than the resolution of the building of the first aerial image 25 and contributes to the analysis of the second damage situation 148 can be easily obtained without setting the zoom magnification of the second camera 37 to a telephoto side than the zoom magnification of the first camera 36.

The first damage situation analysis unit 101 analyzes the first damage situation 127 for each compartment 135 including the plurality of adjacent buildings. Thus, the analysis of the first damage situation 127 can be completed in a shorter time than in a case where the analysis of the first damage situation 127 of each building is performed. As a result, a dispatch timing of the second drone 11 can be advanced.

The plurality of second drones 11 are provided, and the second imaging range determination unit 102 determines the second imaging range 136 for each of the plurality of second drones 11. Thus, it is possible to grasp the damage situation at the disaster site in a shorter time than in the case where the number of second drones 11 is one.

Instead of or in addition to setting the flight altitude of the second drone 11 to be lower than the flight altitude of the first drone 10, the second imaging range 136 may be relatively narrowed by setting the zoom magnification of the second camera 37 to the telephoto side than the zoom magnification of the first camera 36. Similar to the second damage situation 148, the first damage situation 127 may be analyzed for each building. The number of second drones 11 in charge of one flight range FR may be one, or three or more.

Although any one of "large damage" or "small damage" is used as an example of the first damage situation 127, the disclosed technology is not limited thereto. The first damage situation 127 having three or more stages, such as any one of "extreme damage", "medium damage", or "small damage", may be output. A degree of damage may be output as a numerical value of, for example, 1 to 10.

Second Embodiment

In the first embodiment, although the second damage situation 148 is analyzed based only on the second aerial image 26, the disclosed technology is not limited thereto. As in a second embodiment shown in FIGS. 19 and 20, the second damage situation may be analyzed based on the first aerial image 25 in addition to the second aerial image 26.

Figure 19:
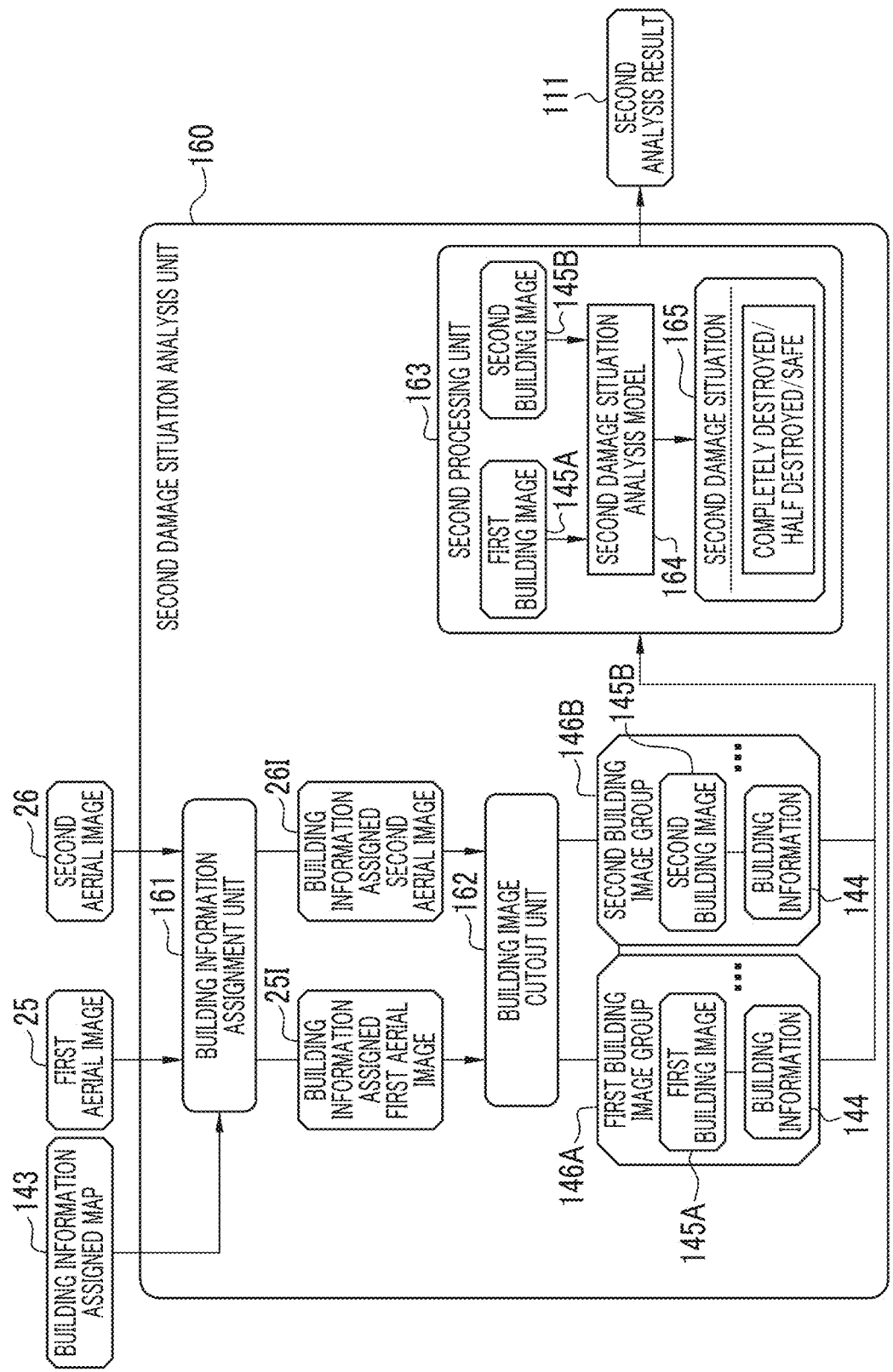
FIG. 19 is a block diagram showing details of a second damage situation analysis unit of a second embodiment.

As an example, as shown in FIG. 19, the building information assignment unit 161 of the second damage situation analysis unit 160 of the second embodiment assigns the second building information 144 to each building appearing in the first aerial image 25 in addition to the second aerial image 26 while referring to the building information assigned map 143, and uses the first aerial image 25 as a building information assigned first aerial image 251. A building image cutout unit 162 cuts out a first building image 145A from the building information assigned first aerial image 251 and cuts out a second building image 145B from the building information assigned second aerial image 261. The second building image 145B is the same as the building image 145 of the first embodiment. The building image cutout unit 162 outputs a first building image group 146A including a plurality of sets of the first building image 145A and the building information 144 and a second building image group 146B including a plurality of sets of the second building image 145B and the building information 144 to a second processing unit 163.

The second processing unit 163 inputs the first building image 145A and the second building image 145B associated with the same building information 144 into a second damage situation analysis model 164. A second damage situation 165 is output from the second damage situation analysis model 164. As in the case of the second damage situation 148 of the first embodiment, the second damage situation 165 is any one of "completely destroyed", "half destroyed", or "safe". The second processing unit 163 outputs the second damage situation 165 from the second damage situation analysis model 164 for all the first building images 145A and the second building images 145B which are included in the first building image group 146A and the second building image group 146B and with which the same building information 144 is associated. The first building image 145A and the second building image 145B with which the same building information 144 is not associated are input to the second damage situation analysis model 147 of the first embodiment and are output the second damage situation 148.

Figure 20:
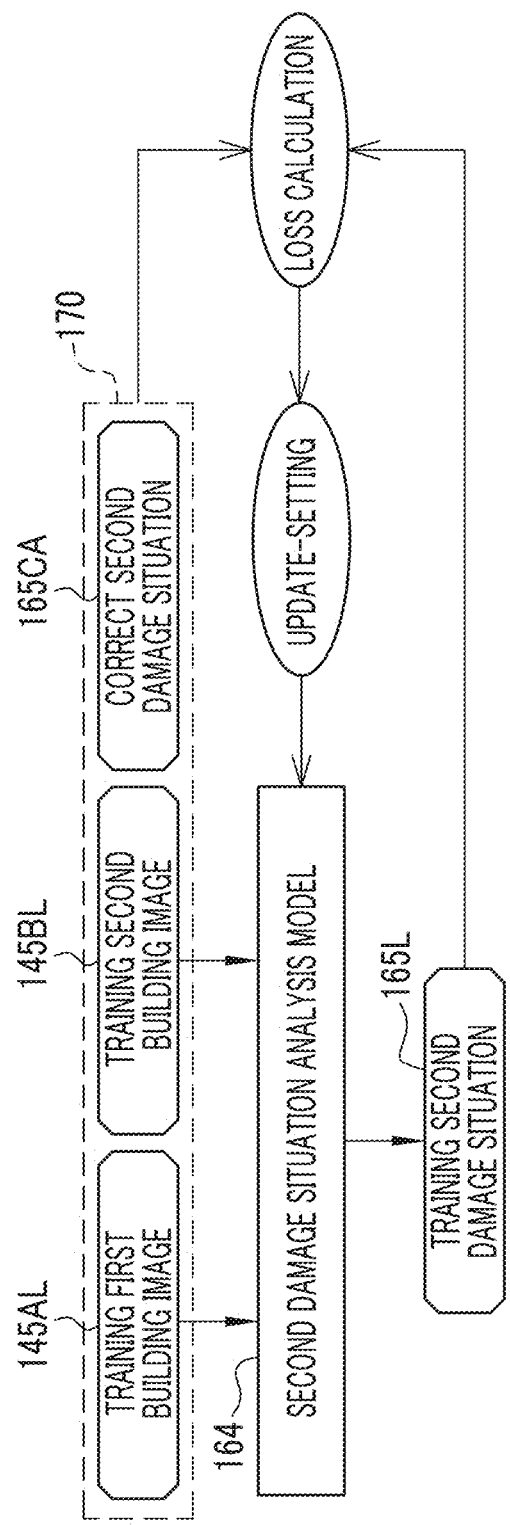
FIG. 20 is a diagram showing an outline of processing in a training phase of a second damage situation analysis model of the second embodiment.

As an example, as shown in FIG. 20, in the training phase, the second damage situation analysis model 164 is trained by being given training data 170. The training data 170 is a set of a training first building image 145AL, a training second building image 145BL, and a correct second damage situation 165CA corresponding to the training first building image 145AL and the training second building image 145BL. The training first building image 145AL is obtained by inputting the first aerial image 25 of a certain area 20 into the building image cutout unit 162. The training second building image 145BL is obtained by inputting the second aerial image 26 of a certain area 20 into the building image cutout unit 162. The correct second damage situation 165CA is a result of actually discriminating the second damage situations 165 of the buildings appearing in the training first building image 145AL and the training second building image 145BL by a qualified person such as a house damage certified person.

In the training phase, the training first building image 145AL and the training second building image 145BL are input to the second damage situation analysis model 164. The second damage situation analysis model 164 outputs a training second damage situation 165L to the training first building image 145AL and the training second building image 145BL. Loss calculation of the second damage situation analysis model 164 using a loss function is performed based on the training second damage situation 165L and the correct second damage situation 165CA. Various coefficients of the second damage situation analysis model 164 are update-set according to a result of the loss calculation, and the second damage situation analysis model 164 is updated according to the update-setting.

In the training phase of the second damage situation analysis model 164, the series of processing of the input of the training first building image 145AL and the training second building image 145BL to the second damage situation analysis model 164, the output of the training second damage situation 165L from the second damage situation analysis model 164, the loss calculation, the update-setting, and the updating of the second damage situation analysis model 164 are repeatedly performed while the training data 170 is being exchanged. The repetition of the series of processing is ended in a case where discrimination accuracy of the training second damage situation 165L for the correct second damage situation 165CA reaches a predetermined set level. The second damage situation analysis model 164 in which the discrimination accuracy reaches the set level is stored in the storage 85 and is used by the second processing unit 163.

As described above, in the second embodiment, the second damage situation analysis unit 160 analyzes the second damage situation 165 based on the first aerial image 25 in addition to the second aerial image 26. Since the building appears relatively small in the first aerial image 25 than in the second aerial image 26, a resolution of the building is inferior to a resolution in the second aerial image 26. However, in the first aerial image 25, the building appears at an angle different from an angle of the second aerial image 26, and it may be easier to grasp the second damage situation 165 than in the second aerial image 26. Thus, there is a high possibility that the second damage situation 165 of the building which is not clear only from the second aerial image 26 can be grasped, and as a result, reliability of the second analysis result 111 can be improved.

Third Embodiment

Figure 21:
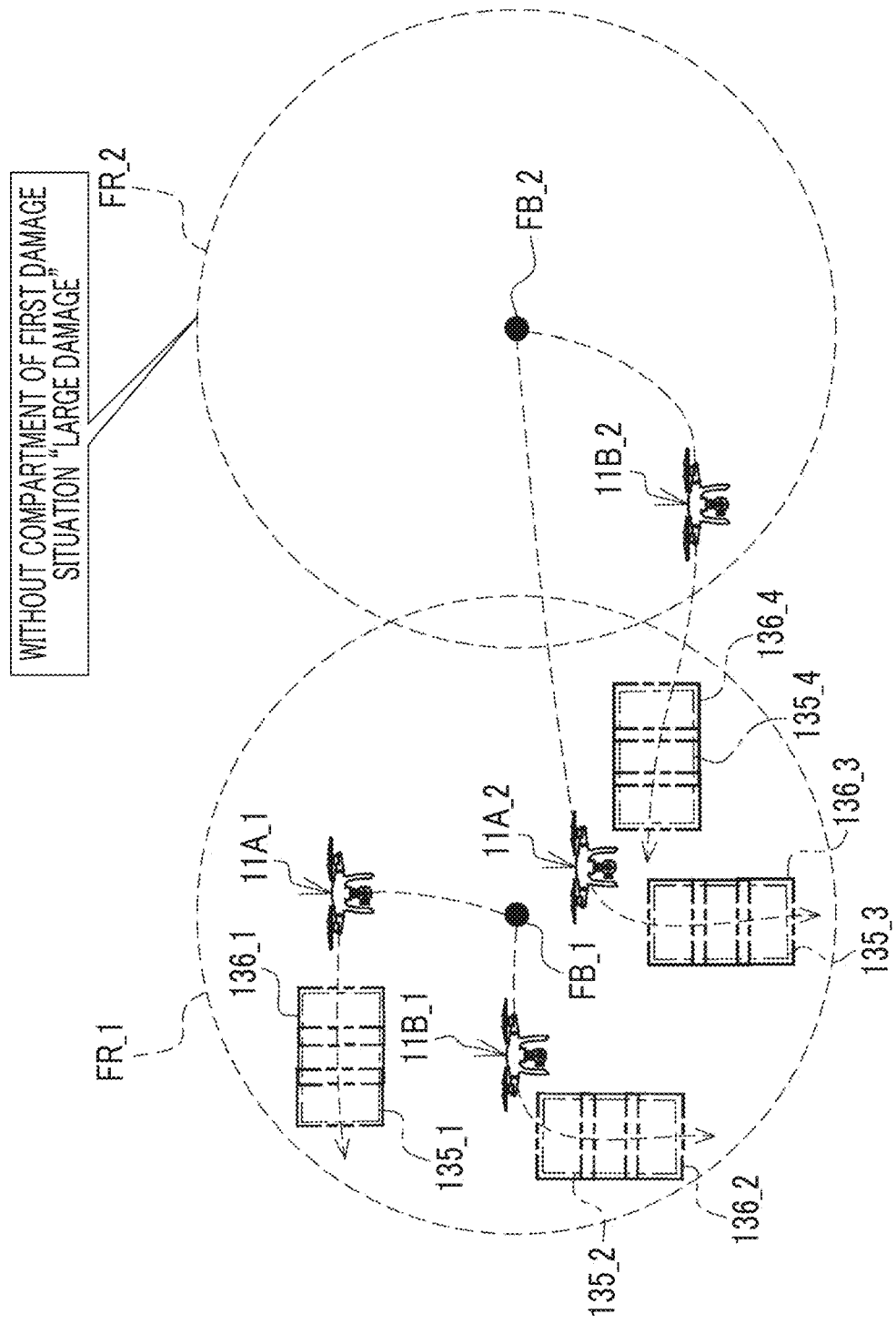
FIG. 21 is a diagram showing a third embodiment in which a second drone is sent to support a region where damage in another flight range is determined to be relatively large.

In a third embodiment shown in FIG. 21, the second drone 11 is sent to support a region where damage of another flight range FR is determined to be relatively large.

As an example, as shown in FIG. 21, it is considered that the first damage situation analysis unit 101 analyzes that the first damage situations 127 of compartments 135_1, 135_2, 135_3, and 135_4 are "large damage" in the first flight range FR_1, whereas the first damage situation analysis unit analyzes that there is no compartment 135 of which the first damage situation 127 is "large damage" in the second flight range FR_2. In this case, the second imaging range determination unit 102 first determines, as the second imaging range 136 of the second drone 11A_1, a plurality of imaging ranges 136_1 that cover the compartment 135_1. The second imaging range determination unit 102 determines, as the second imaging range 136 of the second drone 11B_1, a plurality of imaging ranges 136_2 that cover the compartment 135_2.

The second imaging range determination unit 102 determines, as the second imaging range 136 of the second drone 11A_2 in charge of the second flight range FR_2, a plurality of imaging ranges 136_3 that cover the compartment 135_3. The second imaging range determination unit 102 determines, as the second imaging range 136 of the second drone 11B_2 in charge of the second flight range FR_2, a plurality of imaging ranges 136_4 that cover the compartment 135_4. The second drones 11A_2 and 11B_2 are examples of a "target second drone" according to the disclosed technology. The first flight range FR_1 is an example of "a flight range different from the flight range of the target second drone" according to the disclosed technology, and the second flight range FR_2 is an example of "the flight range of the target second drone" according to the disclosed technology. The compartments 135_3 and 135_4 are examples of "regions where damage is determined to be relatively large" according to the disclosed technology.

As described above, in the third embodiment, in a case where there is a region where damage in a region within the flight range FR of the target second drone 11 is determined to be relatively small and damage is determined to be relatively large in a flight range FR different from the flight range FR of the target second drone 11 as a result of the analysis of the first damage situation 127, the second imaging range determination unit 102 determines, as the second imaging range 136 of the target second drone 11, an imaging range including the region where damage is determined to be relatively large. Thus, it is possible to effectively utilize the second drone 11 having the flight range FR in which damage is determined to be relatively small. As a result, it is possible to grasp the damage situation of the region where damage is determined to be relatively large in a shorter time. Not only the second drone 11 but also the first drone 10 may be sent to support.

It is preferable that a camera having high performance such as a resolution such that each building of the first aerial image 25 clearly appears is used as the first camera 36. In contrast, the second camera 37 may not have the same performance as the first camera 36.

The first aerial image 25 and the second aerial image 26 may be transmitted to the disaster information processing server 12 in a wired manner after the first drone 10 and the second drone 11 land on the departure and arrival base FB.

The flight range FR is not limited to the illustrated three locations. The flight range may be one location, two locations, or four or more locations. A shape of the flight range FR is not limited to a circular shape. The shape of the flight range may be oval or rectangular.

The compartment 135 including the plurality of adjacent buildings is not limited to the illustrated chome. A rectangular region having a predetermined size with a road as a boundary may be used as the compartment 135.

In each of the above-described embodiments, although it has been assumed that the first camera 36 and the second camera 37 are visible light cameras, the disclosed technology is not limited thereto. As the first camera 36 and the second camera 37, an infrared camera may be prepared for capturing in the evening or at night.

In each of the above-described embodiments, although any one of "completely destroyed", "half destroyed", or "safe" is used as an example of the second damage situation on the assumption that an earthquake is mainly the disaster, the disclosed technology is not limited thereto. Any one of "inundation above floor level", "inundation under floor level", or "safe" may be output as the second damage situation on the assumption that flood damage is the disaster. Any one of "completely burned", "half burned", or "safe" may be output as the second damage situation on the assumption that large-scale fire is the disaster. A second damage situation analysis model corresponding to a type of the disaster may be prepared, and the second damage situation analysis model may be properly according to the type of the disaster.

In each of the above-described embodiments, for example, the following various processors can be used as a hardware structure of processing units that execute various kinds of processing such as the RW control unit 100, the first damage situation analysis unit 101, the second imaging range determination unit 102, the transmission control unit 103, the second damage situation analysis units 104 and 160, the screen distribution control unit 105, the compartment image cutout unit 120, the first processing unit 121, the building information assignment units 140 and 161; the building image cutout units 141 and 162, and the second processing units 142 and 163. As described above, in addition to the CPU 87 which is a general-purpose processor that functions as various processing units by executing software (operation program 95), the various processors include a programmable logic device (PLD), which is a processor capable of changing a circuit configuration after manufacture, such as a field programmable gate array (FPGA), and a dedicated electrical circuit, which is a processor having a circuit configuration specifically designed in order to execute specific processing such as an application specific integrated circuit (ASIC).

One processing unit may be constituted by one of these various processors, or may be constituted by a combination of two or more processors of the same type or different types (for example, a combination of a plurality of FPGAs or a combination of a CPU and an FPGA). The plurality of processing units may be constituted by one processor.

As an example in which the plurality of processing units are constituted by one processor, firstly, one processor is constituted by a combination of one or more CPUs and software as represented by computers such as clients and servers, and this processor functions as the plurality of processing units. Secondly, a processor that realizes the functions of the entire system including the plurality of processing units via one integrated circuit (IC) chip is used as represented by a system on chip (SoC). As described above, the various processing units are constituted by using one or more of the various processors as the hardware structure.

More specifically, an electric circuitry in which circuit elements such as semiconductor elements are combined can be used as the hardware structure of these various processors.

The disclosed technology can also appropriately combine various embodiments and/or various modification examples described above. The disclosed technology is not limited to the above embodiments, and may adopt various configurations without departing from the gist. For example, in the present application, although the embodiments have been described by using the multicopter type drone, the drone may be in the form of an airplane, a rotary-wing aircraft, a glider, an airship, or the like as long as the drone is an unmanned aircraft.

The contents described and shown above are detailed descriptions for the portions related to the disclosed technology, and are merely examples of the disclosed technology. For example, the above description of the configurations, functions, actions, and effects is an example of the configurations, functions, actions, and effects of the portions of the disclosed technology. Thus, the deletion of unnecessary portions, the addition of new elements, or the substitution may be performed for the contents described and shown above without departing from the gist of the disclosed technology. In order to avoid complications and facilitate understanding of the portions related to the disclosed technology, in the contents described and shown above, common technical knowledge that does not particularly require description is not described in order to enable the implementation of the disclosed technology.

In the present specification, "A and/or B" has the same meaning as "at least one of A or B". That is, "A and/or B" means that only A may be used, only B may be used, or a combination of A and B may be used. In the present specification, the same concept as "A and/or B" is also applied to a case where three or more matters are expressed by "and/or".

All the documents, patent applications, and technical standards described in the present specification are incorporated in the present specification by reference to the same extent as a case where individual documents, patent applications, and technical standards are specifically and individually noted to be incorporated by reference.

What is claimed is:

1. A disaster information processing apparatus comprising:

a processor; and
a memory connected to or built in the processor,
wherein the processor is configured to:

receive a first aerial image obtained by capturing a first imaging range including a disaster-stricken area by a first camera mounted on a first drone;

analyze a first damage situation of a disaster in the first imaging range based on the first aerial image; and determine a second imaging range of a second camera mounted on a second drone based on an analysis result of the first damage situation, the second imaging range being relatively narrower than the first imaging range.

2. The disaster information processing apparatus according to claim 1, wherein the processor is configured to:

determine, as the second imaging range, an imaging range including a region where damage is determined to be relatively large as a result of the analysis of the first damage situation in the disaster-stricken area.

3. The disaster information processing apparatus according to claim 1, wherein the processor is configured to:

receive a second aerial image obtained by capturing the second imaging range by the second camera; and analyze a second damage situation of the disaster in the second imaging range based on the second aerial image.

4. The disaster information processing apparatus according to claim 3, wherein the processor is configured to:

analyze the second damage situation based on the first aerial image in addition to the second aerial image.

5. The disaster information processing apparatus according to claim 1, wherein the processor is configured to:

set flight altitude of the second drone to be lower than flight altitude of the first drone.

6. The disaster information processing apparatus according to claim 1, wherein the processor is configured to:

analyze the first damage situation for each compartment including a plurality of adjacent buildings.

7. The disaster information processing apparatus according to claim 1, wherein a flight range is set for the second drone in advance, and the processor is configured to:

determine, as the second imaging range of a target second drone, an imaging range including a region where damage is determined to be relatively large in a case where damage of a region within the flight range of the target second drone is determined to be relatively small and there is a region where damage is determined to be relatively large in a flight range different from the flight range of the target second drone as a result of the analysis of the first damage situation.

8. The disaster information processing apparatus according to claim 1, wherein a plurality of the second drones are provided, and the processor is configured to:

determine the second imaging range for each of the plurality of second drones.

9. An operation method of a disaster information processing apparatus, comprising:

receiving a first aerial image obtained by capturing a first imaging range including a disaster-stricken area by a first camera mounted on a first drone;

analyzing a first damage situation of a disaster in the first imaging range based on the first aerial image; and determining a second imaging range of a second camera mounted on a second drone based on an analysis result of the first damage situation, the second imaging range being relatively narrower than the first imaging range.

10. A non-transitory computer-readable storage medium storing an operation program of a disaster information processing apparatus causing a computer to execute processing of:

receiving a first aerial image obtained by capturing a first imaging range including a disaster-stricken area by a first camera mounted on a first drone;

analyzing a first damage situation of a disaster in the first imaging range based on the first aerial image; and determining a second imaging range of a second camera mounted on a second drone based on an analysis result of the first damage situation, the second imaging range being relatively narrower than the first imaging range.

11. A disaster information processing system comprising:

a first drone on which a first camera that captures a first imaging range including a disaster-stricken area to output a first aerial image is mounted;

a second drone on which a second camera that captures a second imaging range relatively narrower than the first imaging range to output a second aerial image is mounted;

a processor; and a memory connected to or built in the processor, wherein the processor is configured to:

receive the first aerial image;

analyze a first damage situation of a disaster in the first imaging range based on the first aerial image; and determine the second imaging range based on an analysis result of the first damage situation.

* * * * *